US012657780B2

(12) United States Patent
Kadam et al.

(10) Patent No.: US 12,657,780 B2
(45) Date of Patent: Jun. 16, 2026

(54) RATE-ADAPTIVE CODEC FOR DYNAMIC POINT CLOUD COMPRESSION

(71) Applicants: SONY GROUP CORPORATION, Tokyo (JP); SONY CORPORATION OF AMERICA, New York, NY (US)

(72) Inventors: Pranav Aniruddha Kadam, Sunnyvale, CA (US); Alexandre Zaghetto, San Jose, CA (US); Danillo Bracco Graziosi, Flagstaff, AZ (US); Ali Tabatabai, Cupertino, CA (US)

(73) Assignees: SONY CORPORATION OF AMERICA, New York, NY (US); SONY GROUP CORPORATION, Tokyo (JP)

( * ) Notice: Subject to any disclaimer, the term of this patent is extended or adjusted under 35 U.S.C. 154(b) by 266 days.

(21) Appl. No.: 18/509,138

(22) Filed: Nov. 14, 2023

(65) Prior Publication Data

US 2024/0212221 A1 Jun. 27, 2024

Related U.S. Application Data

(60) Provisional application No. 63/476,589, filed on Dec. 21, 2022.

(51) Int. Cl.
*G06T 9/00* (2006.01)

(52) U.S. Cl.
CPC .............. *G06T 9/002* (2013.01); *G06T 9/001* (2013.01)

(58) Field of Classification Search
CPC .... G06N 3/0455; G06N 3/0464; G06N 3/047; G06N 3/048; G06N 3/0495;
(Continued)

(56) References Cited

U.S. PATENT DOCUMENTS 10,694,210 B2 6/2020 Chou et al.
11,190,771 B2 11/2021 Han et al.
(Continued)

FOREIGN PATENT DOCUMENTS

WO WO-2021178537 A1 * 9/2021 ............ G06V 20/20
WO WO-2024155441 A1 * 7/2024 ............ H04N 19/54

OTHER PUBLICATIONS

Li Li et al., "Frame-Level Rate Control for Geometry-Based LiDAR Point Cloud Compression," Apr. 19, 2022,IEEE Transactions on Multimedia, vol. 25, 2023,pp. 3855-3864.*
(Continued)

*Primary Examiner* — Omar S Ismail
(74) *Attorney, Agent, or Firm* — CHIP LAW GROUP

(57) ABSTRACT

An electronic device and method for using a rate adaptive codec for dynamic point cloud compression is provided. The electronic device receives a point cloud frame (PCF) sequence that includes a set of reference PCFs and a current PCF that is to be encoded. The electronic device generates 3D feature data based on application of a neural network-based encoder on at least one of the set of reference PCFs and the current PCF. The electronic device selects from an encoding pipeline, an encoding path as an I-frame encoding path or a P-frame encoding path for the current PCF. The selected encoding path extends from an output of the neural network-based encoder and includes a first sequence of transformation operations that is applicable on the 3D feature data. The electronic device generates a bit-stream of coded PCF based on application of the first sequence of transformation operations on the 3D feature data.

18 Claims, 7 Drawing Sheets

(58) Field of Classification Search
CPC ........ G06N 3/0499; G06N 3/088; G06N 3/09;
G06N 3/0985; G06T 9/001; G06T 9/002;
G06T 9/004; H04L 65/765; H04N
19/159; H04N 19/19; H04N 19/597
See application file for complete search history.

(56) References Cited

U.S. PATENT DOCUMENTS

| | | | | |
|---|---|---|---|---|
| 2018/0268256 | A1* | 9/2018 | Di Febbo | G06V 10/82 |
| 2020/0218929 | A1* | 7/2020 | Li | G06V 20/10 |
| 2020/0225673 | A1* | 7/2020 | Ebrahimi Afrouzi | |
| | | | | A47L 11/4011 |
| 2020/0314435 | A1* | 10/2020 | Tourapis | G06T 7/74 |
| 2021/0042964 | A1* | 2/2021 | Yeung | G06N 3/08 |
| 2021/0056324 | A1* | 2/2021 | Chen | G06V 10/82 |
| 2021/0099701 | A1* | 4/2021 | Tourapis | H04N 19/60 |
| 2021/0302992 | A1* | 9/2021 | Chen | G05D 1/0088 |
| 2021/0354718 | A1* | 11/2021 | Lu | G01S 17/89 |
| 2021/0358137 | A1* | 11/2021 | Lee | G06T 7/246 |
| 2021/0365712 | A1* | 11/2021 | Lu | G01S 17/931 |
| 2021/0370968 | A1* | 12/2021 | Xiao | G01C 21/3848 |
| 2021/0373161 | A1* | 12/2021 | Lu | G06V 10/764 |
| 2022/0026920 | A1* | 1/2022 | Ebrahimi Afrouzi | |
| | | | | G06N 3/0495 |
| 2022/0066456 | A1* | 3/2022 | Ebrahimi Afrouzi | |
| | | | | G06F 3/04883 |
| 2022/0187841 | A1* | 6/2022 | Ebrahimi Afrouzi | |
| | | | | G05D 1/0272 |
| 2022/0191542 | A1* | 6/2022 | Ahmadyan | H04N 19/105 |
| 2022/0375133 | A1* | 11/2022 | Wang | G06T 9/00 |

OTHER PUBLICATIONS

Jiahao Pang et al.,"GRASP-Net: Geometric Residual Analysis and Synthesis for Point Cloud Compression," Oct. 10, 2022, APCCPA '22: Proceedings of the 1st International Workshop on Advances in Point Cloud Compression, Processing and Analysis, pp. 11-18.*
Ashek Ahmmed et al.,"Dynamic Point Cloud Geometry Compression Using Cuboid Based Commonality Modeling Framework, " Aug. 23, 2021, 2021 IEEE International Conference on Image Processing (ICIP),pp. 2159-2162.*
Jianqiang Wang et al.,"Multiscale Point Cloud Geometry Compression," May 10, 2021,2021 Data Compression Conference (DCC),pp. 73-80.*
Jianqiang Wang et al.,"Sparse Tensor-Based Multiscale Representation for Point Cloud Geometry Compression," Dec. 1, 2022, IEEE Transactions on Pattern Analysis and Machine Intelligence, vol. 45, No. 7, Jul. 2023,pp. 9055-9066.*

Jianqiang Wang et al."Dynamic Point Cloud Geometry Compression Using Multiscale Inter Conditional Coding," Jan. 28, 2023, Computer Vision and Pattern Recognition,arXiv:2301.12165,pp. 1-4.*
Ze Cui et al.,"Asymmetric Gained Deep Image Compression With Continuous Rate Adaptation," Jun. 2021, Proceedings of the IEEE/CVF Conference on Computer Vision and Pattern Recognition (CVPR), 2021,pp. 10532-10537.*
Tingyu Fan et al.,"D-DPCC: Deep Dynamic Point Cloud Compression via 3D Motion Prediction," May 2, 2022,Computer Vision and Pattern Recognition Machine Learning,arXiv:2205.01135, pp. 1-5.*
Xihua Sheng et al.,"Deep-PCAC: An End-to-End Deep Lossy Compression Framework for Point Cloud Attributes," Jun. 4, 2021, IEEE Transactions on Multimedia, vol. 24, 2022,pp. 2617-2624.*
André F. R. Guarda et al.,"Adaptive Deep Learning-Based Point Cloud Geometry Coding," Dec. 25, 2020, IEEE Journal of Selected Topics in Signal Processing, vol. 15, No. 2, Feb. 2021,pp. 415-422.*
Akhtar, et al., "Dynamic Point Cloud Geometry Compression using Sparse Convolutions", MPEG-137, Document: m59617, Apr. 2022, 8 pages.
Cui, et al., "Asymmetric gained deep image compression with continuous rate adaptation", In Proceedings of the IEEE/CVF Conference on Computer Vision and Pattern Recognition, Aug. 2, 2022, 8 pages.
Choi, et al., "Variable rate deep image compression with a conditional autoencoder", In Proceedings of the IEEE/CVF International Conference on Computer Vision, Sep. 11, 2019, 14 pages.
Wang, et al., "Multiscale Point Cloud Geometry Compression", 2021 Data Compression Conference (DCC), IEEE, Nov. 7, 2020, 10 pages.
Wang, et al., "Sparse Tensor-based Multiscale Representation for Point Cloud Geometry Compression", Computer Vision and Pattern Recognition, Oct. 21, 2022, 17 pages.
Pang, et al., "GRASP-Net: Geometric Residual Analysis and Synthesis for Point Cloud Compression", Image and Video Processing, Sep. 9, 2022, 9 pages.
Fan, et al., "D-DPCC: Deep Dynamic Point Cloud Compression via 3D Motion Prediction", Computer Vision and Pattern Recognition, May 2, 2022, 7 pages.
Wang, et al., "[AI-3DGC] [EE13.54-related] SparsePCGCv3: Dynamic SparsePCGC with Inter Frame Prediction", MPEG Document: m60354, Jul. 2022, 6 pages.
Pranav Kadam et al: "[AI-3DGC] [EE 5.3-related] [New] Unified Intra/Inter Deep Dynamic Point Cloud Compression with Multiple Reference Frames and Rate Adaptation", 141. MPEG Meeting; Jan. 16, 2023-Jan. 20, 2023; Jan. 18, 2023, XP030307867, Retrieved from the Internet: [retrieved on Jan. 18, 2023].

* cited by examiner

600

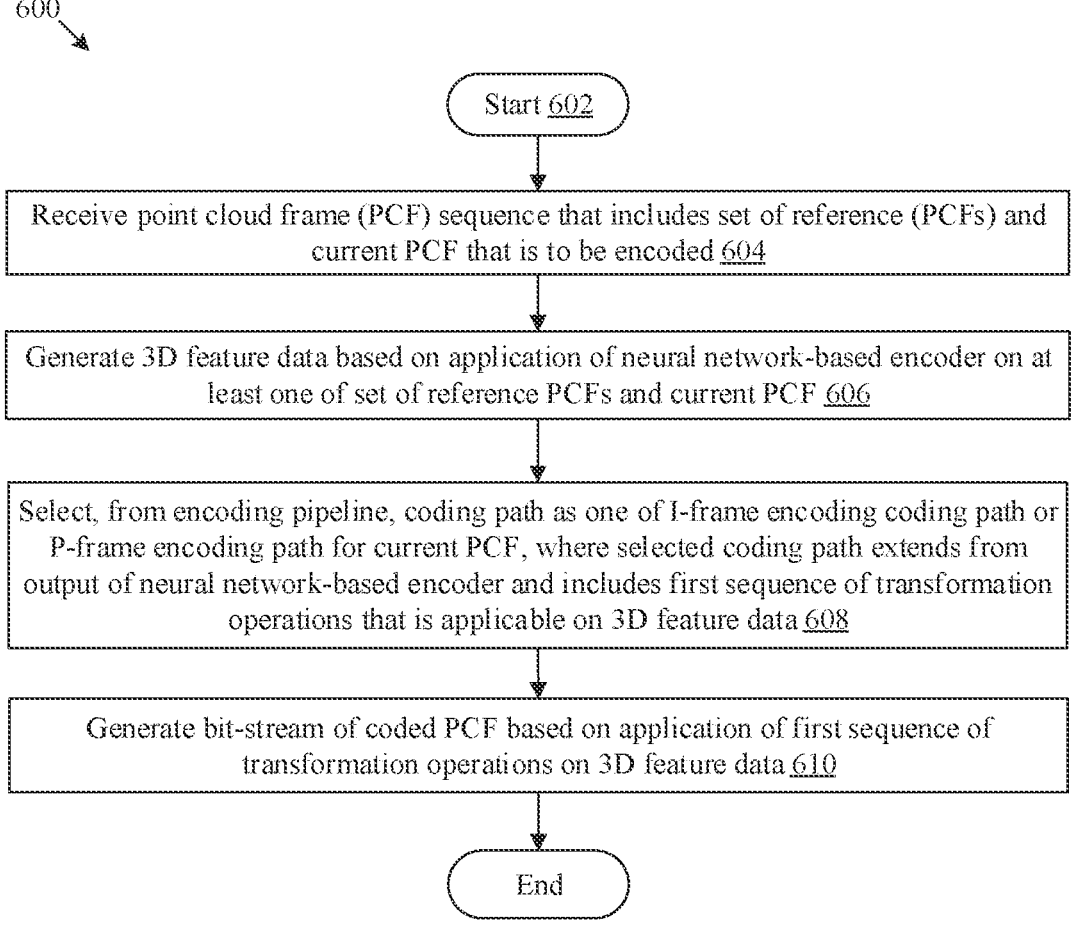

Start 602

Receive point cloud frame (PCF) sequence that includes set of reference (PCFs) and current PCF that is to be encoded 604

Generate 3D feature data based on application of neural network-based encoder on at least one of set of reference PCFs and current PCF 606

Select, from encoding pipeline, coding path as one of I-frame encoding coding path or P-frame encoding path for current PCF, where selected coding path extends from output of neural network-based encoder and includes first sequence of transformation operations that is applicable on 3D feature data 608

Generate bit-stream of coded PCF based on application of first sequence of transformation operations on 3D feature data 610

End

FIG. 6

RATE-ADAPTIVE CODEC FOR DYNAMIC POINT CLOUD COMPRESSION

CROSS-REFERENCE TO RELATED APPLICATIONS/INCORPORATION BY REFERENCE

This application claims priority to U.S. Provisional Patent Application Ser. No. 63/476,589 filed on Dec. 21, 2022, the entire content of which is hereby incorporated herein by reference.

BACKGROUND

Advancements in the field of dynamic point cloud compression (PCC) have led to the development of point cloud encoding approaches for efficient representation of point cloud data associated with a 3D object. The point cloud data may be compressed (i.e., encoded) for generation of encoded point cloud data, which may be stored, processed, or transmitted. Subsequently, the original point cloud may be reconstructed based on the encoded point cloud data. Point cloud data associated with a current point cloud frame may be encoded or decoded based on the current point cloud frame (i.e., I-frame codec) or a set of preceding point cloud frames (i.e., P-frame codec). Each of these encoding or decoding schemes (I-frame or P-frame codec) may have their unique advantages and drawbacks. However, usage of both encoding or decoding schemes in combination may offer certain advantages which may otherwise be unavailable if either of them is used in isolation. However, for combined usage, a separate codec network may be required for each of the I-frame codec and the P-frame codec, even if architecture of each codec network includes identical encoders and decoders. Each codec network may include its own machine learning-based encoder and decoder, and each codec network may be required to be trained individually. Thus, having separate codecs for I-frame and P-frame encoding/decoding may increase latency involved in the training. The increased latency may be due to increase in several network parameters whose values may be required to be computed to obtain an efficient I-frame and P-frame codec. The increased latency and computational cost may deter usage of a combined I-frame and P-frame codec.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for using a rate adaptive codec for dynamic point cloud compression, is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 6 is a flowchart that illustrates operations for an exemplary method for dynamic point cloud compression by use of a rate-adaptive unified I-frame and P-frame codec architecture, in accordance with an embodiment of the disclosure.

DETAILED DESCRIPTION

Figure 1:
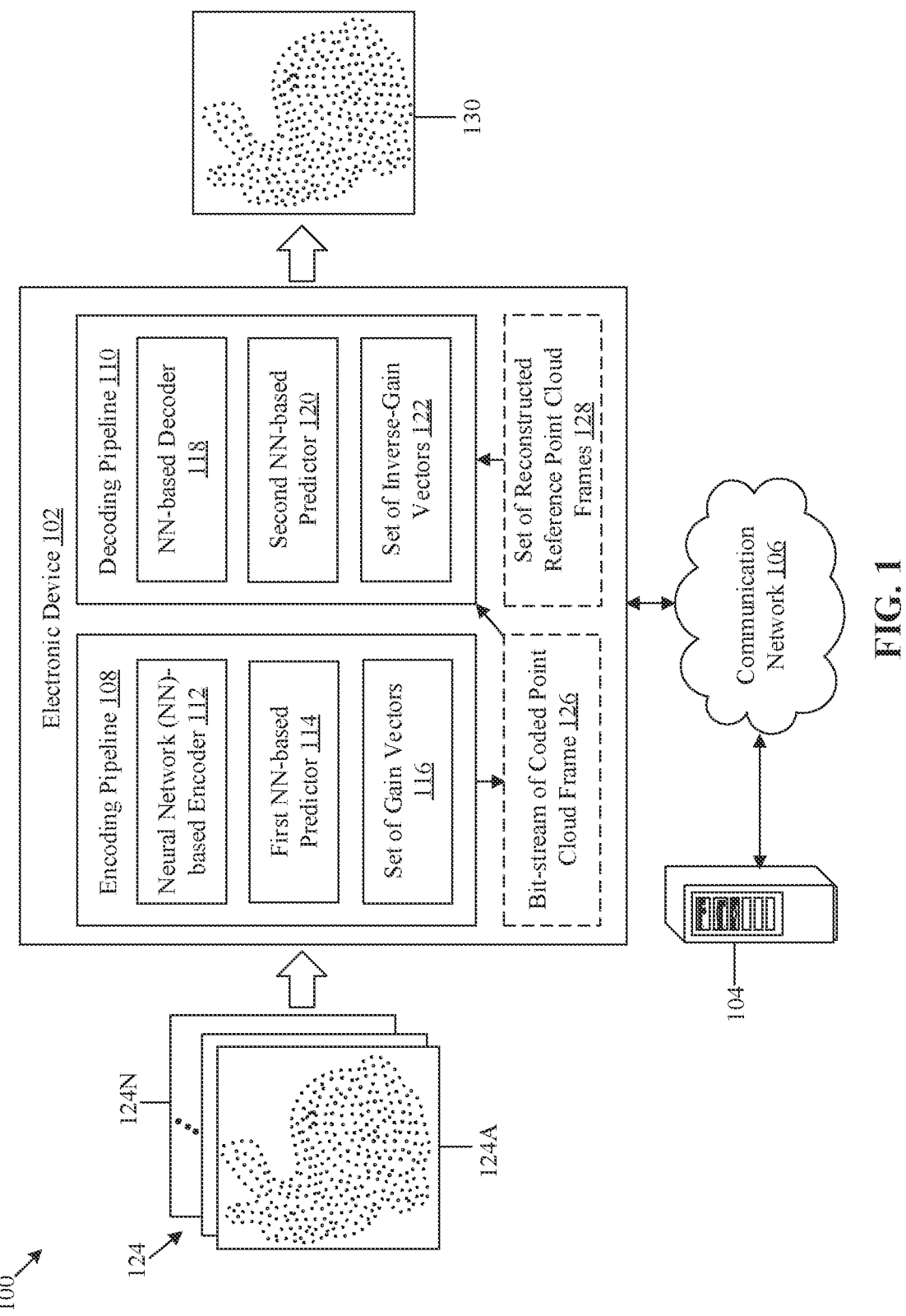
FIG. 1 is a diagram that illustrates an exemplary network environment that includes a rate-adaptive codec for dynamic point cloud compression, in accordance with an embodiment of the disclosure.

The following described implementations may be found in a disclosed electronic device and a method for providing a rate-adaptive codec for dynamic point cloud compression. Exemplary aspects of the disclosure provide the electronic device (for example, a computing device, a gaming console, or a virtual reality goggle) that includes the rate-adaptive codec. The rate-adaptive codec may include an encoding pipeline and a decoding pipeline. The encoding pipeline may unify an intra-frame (i.e., an I-frame) encoder and an inter-frame (i.e., a P-frame) encoder. Similarly, the decoding pipeline may unify an intra-frame (i.e., an I-frame) decoder and an inter-frame (i.e., a P-frame) decoder. The encoding pipeline may include a set of gain vectors. The set of gain vectors may modulate feature data associated with point cloud frames such that the point cloud frames are encoded at a desired encoding rate for generation of encoded point cloud data. The decoding pipeline may include a set of inverse-gain vectors. For decoding or reconstructing the point cloud frames, the set of inverse-gain vectors may demodulate the encoded point cloud data at rates that may correspond to the different encoding rates.

The electronic device may receive a point cloud frame (PCF) sequence that may include a set of reference PCFs and a current PCF. The current PCF may be a 3D frame that is to be encoded (or compressed). After the reception, the electronic device may generate three-dimensional (3D) feature data based on application of a neural network-based encoder, included in the encoding pipeline, on at least one of the set of reference PCFs and the current PCF. Once the 3D feature data is generated, the electronic device may select a coding path from the encoding pipeline. The coding path may be selected as an I-frame encoding coding path (i.e., the intra-frame encoder) or a P-frame encoding path (i.e., the inter-frame encoder) for (encoding of) the current PCF. The selected coding path may extend from an output of the neural network-based encoder and may include a first sequence of transformation operations that may be applicable on the 3D feature data. Finally, the electronic device may generate a bit-stream of coded PCF (i.e., encoded point cloud data) based on application of the first sequence of transformation operations on the 3D feature data.

For reconstruction of the current PCF, the electronic device may apply a decoding operation on the bit-stream of coded PCF. Based on the application, a set of decoded features of the current PCF may be generated. Thereafter, the electronic device may select, from the decoding pipeline, a decoding path as an I-frame decoding path (i.e., the intra-frame decoder) or a P-frame decoding path (i.e., the inter-frame decoder). The selected decoding path may include a second sequence of transformation operations that may be applicable on the set of decoded features. The electronic device may reconstruct the current PCF of the PCF sequence based on application of the second sequence of transformation operations on the set of decoded features.

Typically, a PCF may be encoded or decoded using an I-frame coder or a P-frame coder. As the PCF includes a significant amount of data, such compression and reconstruction may be necessary to enable storage, rendering, transmission, or reception, of the PCF. The I-frame coder may encode/reconstruct the PCF without any reference PCFs, whereas the P-frame coder may encode/reconstruct the PCF by use of a set of reference PCFs that may precede or succeed the PCF in a timeline of PCFs. The architectures of each of I-frame and P-frame coders may include identical machine learning-based encoders and decoders, (i.e., the encoders in each of the I-frame and P-frame coders may be identical and the decoders in each of the I-frame and P-frame coders may be identical). Despite the inclusion of identical encoders/decoders in the architectures of the I-frame and P-frame coders, a separate coder network may be required for each of the I-frame and P-frame coders for a combined usage. Such a requirement may lead to redundancies in the coder network due to inclusion of duplicate encoders and decoders. Further, a number of coder network parameters, storage cost (memory requirement), computational costs, and a latency involved in training the coder network may increase due to the redundancies. A coder network (that includes an I-frame coder and a P-frame coder) may be trained to encode a PCF at a specific bitrate and reconstruct the PCF from point cloud data encoded at the specific bitrate. To encode the PCF at a different bitrate or to reconstruct the PCF from point cloud data that is encoded at a different bitrate, the coder network may be required to be retrained. In some scenarios, multiple coder networks may be used if the PCF is to be encoded at different bitrates or is to be reconstructed from point cloud data encoded at different bitrates. Each of the coder networks may include identical encoders and decoders trained to encode the PCF at a specific bitrate or to reconstruct the PCF from point cloud data encoded at a specific bitrate. Thus, redundancies may be introduced if the PCF needs to be encoded at different bitrates or reconstructed from point cloud data encoded at different bitrates.

In order to address the aforementioned issues, the electronic device may provide a rate-adaptive codec that may include a compression network trained to encode a PCF at a desired bitrate (i.e., a tunable or adjustable rate) and a reconstruction network trained to reconstruct the PCF irrespective of an encoding rate that may have been used to encode the PCF. The compression network may be a unification of two encoding paths, viz., an I-frame encoding path and a P-frame encoding path, into an encoding pipeline. The reconstruction network may be a unification of two decoding paths, viz., an I-frame decoding path and a P-frame decoding path into a decoding pipeline. The rate-adaptive codec may allow seamless transitions between the I-frame and the P-frame encoding paths or between the I-frame and the P-frame decoding paths. The unification of the coding paths and the unification of the decoding paths may result in minimization of a number of encoders and a number of decoders included in the encoding pipeline and decoding pipeline, respectively. The performance of the rate-adaptive codec may improve due to a reduction in computational cost and latency that may be involved in training the encoding pipeline and the decoding pipeline of the rate-adaptive codec. The reduction in both the computational cost and the latency may be due to a significant decrease in the number of network parameters (which may be due to the minimization of a number of encoders and a number of decoders included in the rate-adaptive codec).

The rate-adaptive codec may enable encoding PCFs at adjustable encoding rates (which can be continuous values instead of discrete values) by use of a modulation network. The modulation network may provide a set of gain vectors that may be generated based on training of a fully connected neural network. Based on selections of gain vectors from the set of gain vectors, features associated with a current PCF or a set of preceding PCFs may be modulated for encoding of the current PCF at different encoding rates. The rate-adaptive codec may further enable reconstruction of the PCFs from bit-streams of coded PCF (generated based on encoding of the current PCF) by use of a demodulation network. The demodulation network may include a set of inverse-gain vectors and each inverse-gain vector may correspond to a gain-vector of the set of gain vectors that may be used for encoding of the current PCF. Inverse-gain vectors of the set of inverse-gain vectors may be selected for the reconstruction of the PCFs from the bit-streams of coded PCF. The coded PCF may be generated based on modulation using gain vectors that may correspond to the selected inverse-gain vectors. Thus, rate-adaptive codec may enable encoding over a discrete set of rate points (encoding rates).

The electronic device may generate additional gain-vectors based on the set of gain vectors and corresponding inverse-gain vectors based on the set of inverse-gain vectors. The generation may be based on interpolation and/or extrapolation using gain-vectors of the set of gain vectors and inverse-gain vectors of the set of inverse-gain vectors. The generation of the additional gain-vectors and inverse-gain vectors may allow encoding PCFs at any arbitrary target bitrate.

FIG. 1 is a diagram that illustrates an exemplary network environment that includes a rate-adaptive codec for dynamic point cloud compression, in accordance with an embodiment of the disclosure. With reference to FIG. 1, there is shown a network environment 100. The network environment 100 may include an electronic device 102, and a server 104. The electronic device 102 may communicate with the server 104, through one or more networks (such as a communication network 106). The electronic device 102 may include an encoding pipeline 108 and a decoding pipeline 110. The encoding pipeline 108 may a neural network-based encoder 112, a first neural network-based predictor 114, and a set of gain vectors 116. The decoding pipeline 110 may a neural network-based decoder 118, a second neural network-based predictor 120, and a set of inverse-gain vectors 122. The electronic device 102 may receive a point cloud frame (PCF) sequence 124 as input. The PCF sequence 124 may include and a current PCF 124A and a set of reference point cloud frames (PCFs) 124B . . . 124N. The encoding pipeline 108 may receive the PCF sequence 124 as input and generate, as output, a bit-stream of coded PCF 126 associated with the current PCF 124A. The decoding pipeline 110 may receive, as inputs, the bit-stream of coded PCF 126 and a set of reconstructed reference PCFs 128. The decoding pipeline 110 may generate a reconstructed PCF 130 (i.e., a reconstructed point cloud that corresponds to current PCF 124A) as output.

The electronic device 102 may include suitable logic, circuitry, interfaces, and/or code that may be configured to generate 3D feature data based on an application of the neural network-based encoder 112 on the PCF sequence 124. The electronic device 102 may further select a coding path as an I-frame encoding path or a P-frame encoding path for the current PCF 124A. Based on the selection, a first sequence of transformation operations may be applied on the 3D feature data for generation of the bit-stream of coded PCF 126. The electronic device 102 may further apply a decoding operation on the bit-stream of coded PCF 126 to generate a set of decoded features of the current PCF 124A. The electronic device 102 may further select a decoding path as an I-frame decoding path or a P-frame decoding path for decoding the current PCF 124A. Based on the selection, a second sequence of transformation operations may be applied on the set of decoded features. Based on the application of the second sequence of transformation operations, the reconstructed PCF 130, which may correspond to the current PCF 124A, may be generated. Examples of the electronic device 102 may include, but are not limited to, a computing device, a video-conferencing system, an augmented reality (AR) device, a virtual reality (VR device), a mixed reality (MR) device, a game console, a server, a smart wearable device, a mainframe machine, a computer workstation, and/or a consumer electronic (CE) device.

The server 104 may include suitable logic, circuitry, interfaces, and/or code that may be configured to store the PCF sequence 124 (i.e., the current PCF 124A and the set of reference PCFs 124B . . . 124N) and information associated with the PCF sequence 124. The server 104 may be further configured to receive a request from the electronic device 102 for the PCF sequence 124. The server 104 may transmit the PCF sequence 124 to the electronic device 102 based on reception of the request. In some embodiments, the server 104 may include the encoding pipeline 108 and/or the decoding pipeline 110 and execute associated operations of the encoding pipeline 108 and/or the decoding pipeline 110. Based on the execution, the server 104 may generate the bit-stream of coded PCF 126 and/or the reconstructed PCF 130. The server 104 may transmit the bit-stream of coded PCF 126 and/or the reconstructed PCF 130 to the electronic device 102. The server 104 may execute operations through web applications, cloud applications, HTTP requests, repository operations, file transfer, and the like. Example implementations of the server 104 may include, but are not limited to, a database server, a file server, a web server, an application server, a mainframe server, a cloud computing server, or a combination thereof.

In at least one embodiment, the server 104 may be implemented as a plurality of distributed cloud-based resources by use of several technologies that are well known to those ordinarily skilled in the art. A person with ordinary skill in the art will understand that the scope of the disclosure may not be limited to the implementation of the server 104 and the electronic device 102, as two separate entities. In some embodiments, the functionalities of the server 104 can be incorporated in its entirety or at least partially in the electronic device 102 without a departure from the scope of the disclosure.

The communication network 106 may include a communication medium through which the electronic device 102 and the server 104 may communicate with each other. The communication network 106 may be a wired or wireless communication network. Examples of the communication network 106 may include, but are not limited to, Internet, a Wireless Fidelity (Wi-Fi) network, a Personal Area Network (PAN), a Local Area Network (LAN), or a Metropolitan Area Network (MAN). The electronic device 102 may be configured to connect to the communication network 106, in accordance with various wired and/or wireless communication protocols. Examples of such communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The neural network-based encoder 112 of the encoding pipeline 108 may include suitable logic, circuitry, interfaces, and/or code, that may be configured to encode each PCF included in the PCF sequence 124 to generate a feature set associated with 3D points of each PCF. The feature set may include a first set of features associated with the current PCF 124A and a second set of features associated with the set of reference PCFs 124B . . . 124N. The neural network-based encoder 112 may encode the current PCF 124A to generate the first set of features associated with 3D points in the current PCF 124A. Similarly, the neural network-based encoder 112 may encode each reference PCF of the set of reference PCFs 124B . . . 124N for generation of the second set of features associated with 3D points of each reference PCF. The neural network-based encoder 112 may be implemented as a Deep Neural Network (DNN) in the form of computer-executable code on a Graphical Processing Unit (GPU), a Central Processing Unit (CPU), a Tensor Processing Unit (TPU), a Reduced Instruction Set Computing (RISC), Application-Specific Integrated Circuit (ASIC), or a Complex Instruction Set Computing (CISC) processor, a co-processor, and/or a combination thereof. In some other embodiments, the neural network-based encoder 112 may be implemented as a DNN on a specialized hardware interfaced with other computational circuitries of the electronic device 102. In such implementations, the neural network-based encoder 112 may be associated with a specific form factor on a specific computational circuitry. Examples of the specific computational circuitry may include, but are not limited to, a field programmable gate array (FPGA), programmable logic devices (PLDs), an ASIC, a programmable ASIC (PL-ASIC), application specific integrated parts (ASSPs), and a System-on-Chip (SOC) based on standard microprocessors (MPUs) or digital signal processors (DSPs). In accordance with an embodiment, the neural network-based encoder 112 may be also interfaced with a GPU to parallelize operations of the neural network-based encoder 112.

Each of the first neural network-based predictor 114 and the second neural network-based predictor 120 may be a computational network or a system of artificial neurons that may be typically arranged in a plurality of layers. Each of the first neural network-based predictor 114 and the second neural network-based predictor 120 may be defined by its hyper-parameters, for example, activation function(s), a number of weights, a cost function, a regularization function, an input size, a number of layers, and the like. Further, the layers may include an input layer, one or more hidden layers, and an output layer. Each layer of the plurality of layers may include one or more nodes (or artificial neurons). Outputs of all nodes in the input layer may be coupled to at least one node of hidden layer(s). Similarly, inputs of each hidden layer may be coupled to outputs of at least one node in other layers of each of the first neural network-based predictor 114 and the second neural network-based predictor 120. Outputs of each hidden layer may be coupled to inputs of at least one node in other layers of each of the first neural network-based predictor 114 and the second neural network-based predictor 120. Node(s) in the final layer may receive inputs from at least one hidden layer to output a result. The number of layers and the number of nodes in each layer may be determined from the hyper-parameters of each of the first neural network-based predictor 114 and the second neural network-based predictor 120. Such hyper-parameters may be set before, while training, or after training each of the first neural network-based predictor 114 and the second neural network-based predictor 120 on a training dataset.

Each node may correspond to a mathematical function (e.g., a sigmoid function or a rectified linear unit) with parameters that are tunable during training of each of the first neural network-based predictor 114 and the second neural network-based predictor 120. The set of parameters may include a weight parameter, a regularization parameter, and the like. Each node may use the mathematical function to compute an output based on one or more inputs from nodes in other layer(s) (e.g., previous layer(s)) of each of the first neural network-based predictor 114 and the second neural network-based predictor 120. All or some of the nodes of each of the first neural network-based predictor 114 and the second neural network-based predictor 120 may correspond to same or a different mathematical function. In training of each of the first neural network-based predictor 114 and the second neural network-based predictor 120, one or more parameters of each node of each of the first neural network-based predictor 114 and the second neural network-based predictor 120 may be updated based on whether output of the final layer for a given input (from the training dataset) matches a correct result in accordance with a loss function for each of the first neural network-based predictor 114 and the second neural network-based predictor 120. The above process may be repeated for same or a different input until a minima of the loss function is achieved, and a training error is minimized. Several methods for training are known in art, for example, gradient descent, stochastic gradient descent, batch gradient descent, gradient boost, meta-heuristics, and the like.

Each of the first neural network-based predictor 114 and the second neural network-based predictor 120 may be a machine learning model that is trained to generate multi-scale features associated with reference PCFs. The first neural network-based predictor 114 may receive, as inputs, the second set of features associated with 3D points of each reference PCF of the set of reference PCFs 124B . . . 124N and target coordinate information associated with the current PCF 124A. The second neural network-based predictor 120 may receive, as inputs, a set of features associated with 3D points of each reconstructed reference PCF of the set of reconstructed reference PCFs 128, and decoded target coordinate information associated with the current PCF 124A. Each of the first neural network-based predictor 114 and the second neural network-based predictor 120 may generate a prediction as output. The prediction may be indicative of encoded features associated with the current PCF 124A.

In some embodiments, each of the first neural network-based predictor 114 and the second neural network-based predictor 120 may include electronic data, which may be implemented as a software component of an application executable on the electronic device 102. Each of the first neural network-based predictor 114 and the second neural network-based predictor 120 may rely on libraries, external scripts, or logic/instructions for execution by a processing device included in the electronic device 102. In one or more embodiments, each of the first neural network-based predictor 114 and the second neural network-based predictor 120 may be implemented using hardware that may include a processor, a microprocessor (e.g., to perform or control performance of one or more operations), a FPGA, or an ASIC. Alternatively, in some embodiments, each of the first neural network-based predictor 114 and the second neural network-based predictor 120 may be implemented using a combination of hardware and software. Examples of each of the first neural network-based predictor 114 and the second neural network-based predictor 120 may include, but may not be limited to, a DNN, a convolutional neural network (CNN), an artificial neural network (ANN), a fully connected neural network, a deep Bayesian neural network, or a combination of such networks. In an embodiment, each of the first neural network-based predictor 114 and the second neural network-based predictor 120 may correspond to a learning engine that may execute numerical computation techniques using data flow graphs. In certain embodiments, each of the first neural network-based predictor 114 and the second neural network-based predictor 120 may be based on a hybrid architecture of multiple DNNs.

The set of gain vectors 116, included in the encoding pipeline 108, may be used to modulate features associated with the PCF sequence 124. The set of gain vectors 116 may be generated based on training of a first neural network model (for example, a multi-layer perceptron). The first neural network model may be trained based on a first set of bits-per-point (BPP) values that may be indicative of a set of encoding rates. The first set of BPP values may be encoded based on a one-hot encoding scheme for generation of a set of one-hot vectors. The set of one-hot vectors may be fed as inputs to the first neural network model for training the first neural network model. Based on the training, the set of gain vectors 116 may be generated. Each gain vector of the set of gain vectors 116 may be associated with an encoding rate and modulate the first set of features associated with the current PCF 124A or second set of features associated with the set of reference PCFs 124B . . . 124N such that the current PCF 124A is encoded at the encoding rate.

The neural network-based decoder 118 may include suitable logic, circuitry, and/or interfaces that may be configured to reconstruct the current PCF 124A based on at least one of the bit-stream of coded PCF 126 and the set of reconstructed reference PCFs 128. The neural network-based decoder 118 may be implemented as a DNN (computer-executable code format) on a GPU, a CPU, a TPU, a RISC processor, an ASIC processor, a CISC processor, a co-processor, and/or a combination thereof. In some other embodiments, the neural network-based decoder 118 may be implemented as a DNN on a specialized hardware interfaced with other computational circuitries of the electronic device 102. In such implementations, the neural network-based decoder 118 may be associated with a specific form factor on a specific computational circuitry. Examples of the specific computational circuitry may include, but are not limited to, a FPGA, PLDs, an ASIC, a PL-ASIC, ASSPs, and a SOC based on standard MPUs or DSPs. In some embodiments, the neural network-based decoder 118 may be interfaced with a GPU to parallelize the operations of the neural network-based decoder 118.

The set of inverse-gain vectors 122, included in the decoding pipeline 110, may be used to demodulate features associated with a set of decoded features (which may be generated based on the bit-stream of coded PCF 126) of the PCF sequence 124. The set of inverse-gain vectors 122 may be generated based on training of a second neural network model (for example, a multi-layer perceptron). The second neural network model may be trained based on a second set of BPP values that may correspond to the set of decoding rates. The set of decoding rates may correspond to the set of encoding rates. The second set of BPP values may be encoded based on a one-hot encoding scheme for generation of a set of one-hot vectors. The set of one-hot vectors may be fed as inputs to the second neural network model for training the second neural network model. Based on the training, the set of inverse-gain vectors 122 may be generated. Each inverse-gain vector 122 of the set of inverse-gain vectors 122 may be associated with a decoding rate and demodulate features associated with set of decoded features such that the current PCF 124A is decoded at the decoding rate for generation of the reconstructed PCF 130.

Each PCF of the PCF sequence 124 (i.e., the current PCF 124A and the set of reference PCFs 124B . . . 124N) may correspond to a set of geometrical representations of a set of 3D objects (such as a mouse) in a 3D environment. Each PCF may constitute a set of 3D points located in different positions of a 3D space of the 3D environment. In some embodiments, the electronic device 102 may generate the PCF sequence 124 or acquire the PCF sequence 124 from the server 104. Each 3D point in each PCF of the PCF sequence 124 may include geometrical information (which may include coordinates of a corresponding 3D point in a corresponding PCF), and attribute information associated with the corresponding 3D point. The attribute information may include color information, reflectance information, opacity information, normal vector information, material identifier information, or texture information.

The bit-stream of coded PCF 126 may be generated based on an encoding of each PCF of the PCF sequence 124 at one or more encoding rates. The bit-stream of coded PCF 126 may be generated based on application of a first sequence of transformation operations on at least one of the first set of features associated with the current PCF 124A and the second set of features associated with the set of reference PCFs 124B . . . 124N. The first sequence of transformation operations may include a modulation of the first set of features or the second set of features by use of the set of gain vectors 116 such that the current PCF 124A is encoded at one or more encoding rates. The bit-stream of coded PCF 126 may be generated as an output of the encoding pipeline 108 and received as an input by the decoding pipeline 110. Based on the bit-stream of coded PCF 126, the decoding pipeline 110 may generate a set of decoded features of the current PCF 124A.

Prior to the reconstruction of the current PCF 124A, the set of reconstructed reference PCFs 128 may include PCFs that may have been reconstructed via the decoding pipeline 110. The PCFs of the set of reconstructed reference PCFs 128 may be generated based on a decoding of bit-streams of coded PCFs. The bit-streams of coded PCFs may be generated based on encoding of the set of reference PCFs 124B . . . 124N. The set of reconstructed reference PCFs 128 may be used for the reconstruction of the current PCF 124A (i.e., generation of the reconstructed PCF 130) based on a selection of a P-frame decoding path of the decoding pipeline 110.

The reconstructed PCF 130 may be a frame of reconstructed 3D data that corresponds to the current PCF 124A. The electronic device 102 may reconstruct, via the neural network-based decoder 118, the current PCF 124A based on the bit-stream of coded PCF 126. The reconstruction may be based on a demodulation of decoded features associated with the current PCF 124A (that may be generated based on the bit-stream of coded PCF 126).

In operation, the electronic device 102 may be configured to receive the PCF sequence 124 that may include the set of reference PCFs 124B . . . 124N and the current PCF 124A that is to be encoded. In accordance with an embodiment, each PCF of the set of reference PCFs 124B . . . 124N may precede the current PCF 124A in a timeline of reception of the PCF sequence 124.

The electronic device 102 may be further configured to generate 3D feature data based on application of the neural network-based encoder 112 on at least one of the set of reference PCFs 124B . . . 124N and the current PCF 124A. In accordance with an embodiment, the 3D feature data may include the first set of features associated with the current PCF 124A. The first set of features may be generated as output of the neural network-based encoder 112, based on application of the neural network-based encoder 112 on the current PCF 124A. The first set of features may be associated with occupancy of the 3D points in the current PCF 124A. In some embodiments, the first set of features may include features associated with occupancy of a set of 3D points in the current PCF 124A that are to be encoded. The set of 3D points, that are to be encoded, may be received as a user input. The 3D feature data may further include the second set of features associated with the set of reference PCFs 124B . . . 124N. The second set of features may be generated as output of the neural network-based encoder 112, based on application of the neural network-based encoder 112 on each reference PCF of the set of reference PCFs 124B . . . 124N. The second set of features may include reference features that may be associated with occupancy of 3D points in each reference PCF of the set of reference PCFs 124B . . . 124N.

The electronic device 102 may be further configured to select from the encoding pipeline 108, an encoding path as one of an I-frame encoding path or a P-frame encoding path for the current PCF 124A. The selected coding path may extend from an output of the neural network-based encoder 112 and may include a first sequence of transformation operations that may be applicable on the generated 3D feature data. In accordance with an embodiment, the first sequence of transformation operations may be applicable on the first set of features (generated as the output of the neural network-based encoder 112) based on a selection of the coding path as the I-frame encoding path. On the other hand, the first sequence of transformation operations may be applicable on the first set of features and the second set of features (generated as the output of the neural network-based encoder 112) based on a selection of the coding path as the P-frame encoding path.

In accordance with an embodiment, based on the selection of the coding path as the I-frame encoding path, the first sequence of transformation operations may include an application of a gain vector of the set of gain vectors 116 on the first set of features to generate a first set of gain-modulated features. The gain vector may be selected from amongst the set of gain vectors 116. The selection may be based on association of the gain vector with an encoding rate and a reception of an input by the electronic device 102. For example, the input may be indicative of a selected encoding rate that matches the encoding rate associated with the gain vector.

In accordance with an embodiment, based on the selection of the coding path as the P-frame encoding path, the first sequence of transformation operations may include generation of a first set of predicted features based on application of the first neural network-based predictor 114 on the second set of features. In some embodiments, the first set of predicted features may be associated with a set of 3D points of each reference PCF of the set of reference PCFs 124B . . . 124N that may correspond to the set of 3D points in the current PCF 124A to be encoded. The first set of predicted features may be generated as output of the first neural network-based predictor 114.

The first sequence of transformation operations may further include application of a gain vector of the set of gain vectors 116 on each of the first set of features and the first set of predicted features. The application of the gain vector on the first set of features may lead to a generation of a first set of gain-modulated features and the application of the gain vector on the first set of predicted features may lead to a generation of a second set of gain-modulated features. The first set of gain-modulated features may be generated based on modulation of the first set of features by use of the gain vector. Similarly, the second set of gain-modulated features may be generated based on modulation of the first set of predicted features by use of the gain vector. The gain vector may be selected from amongst the set of gain vectors 116 based on association of the gain vector with an encoding rate that matches a selected encoding rate (indicated in an input received by the electronic device 102). Thereafter, a difference operation may be applied on the first set of gain-modulated features and the second set of gain-modulated features to generate a set of residual features such that the current PCF 124A is encoded at the selected encoded rate.

The electronic device 102 may be further configured to generate the bit-stream of coded PCF 126 based on application of the first sequence of transformation operations on the 3D feature data. The application of the first sequence of transformation operations may be based on the selection of the I-frame encoding path or the P-frame encoding path. Therefore, the generation of the bit-stream of coded PCF 126 may be based on the first set of gain-modulated features (if the I-frame encoding path is selected) or the set of residual features (if the P-frame encoding path is selected).

At a decoding stage, the electronic device 102 may be configured to apply a decoding operation on the bit-stream of coded PCF 126 to generate a set of decoded features of the current PCF 124A. The generation of the set of decoded features may be based on whether the I-frame encoding path or the P-frame encoding path is selected for the generation of the bit-stream of coded PCF 126. The set of decoded features may correspond to a set of reconstructed residual features (reconstructed based on the set of residual features) if the P-frame encoding path was selected. On the other hand, the set of decoded features may correspond to a set of reconstructed gain-modulated features (reconstructed based on the first set of gain-modulated features) if the I-frame encoding path was selected.

The electronic device 102 may be further configured to select from the decoding pipeline 110, a decoding path as one of an I-frame decoding path or a P-frame decoding path. The decoding path may include a second sequence of transformation operations applicable on the set of decoded features. The selection of the decoding path as the I-frame decoding path may be based on selection of the I-frame encoding path as the encoding path. On the other hand, the selection of the decoding path as the P-frame decoding path may be based on selection of the P-frame encoding path as the encoding path. Thus, the second sequence of transformation operations may be applicable on the reconstructed gain-modulated features or the set of reconstructed residual features.

Based on the selection of the I-frame decoding path, the second sequence of transformation operations may be applied on the set of reconstructed gain-modulated features (i.e., the set of decoded features). The second sequence of transformation operations may include an application of a selected inverse-gain vector on the set of decoded features to generate a set of gain-demodulated features. The selected inverse-gain vector may correspond to a gain-vector that was selected for modulating the first set of features (included in the 3D feature data). The inverse-gain vector may be selected from amongst the set of inverse-gain vectors 122 based on an association of the inverse-gain vector with a decoding rate and reception of an input that may be indicative of a selected decoding rate that matches the decoding rate associated with the inverse-gain vector. The input may be based on the encoding rate associated with the gain vector that corresponds to the selected inverse-gain vector. The set of gain-demodulated features may be generated based on demodulation of the set of reconstructed gain-modulated features such that the current PCF 124A may be decoded at the selected decoding rate.

Based on the selection of the P-frame decoding path, the second sequence of transformation operations may be applied on the set of reconstructed residual features (i.e., the set of decoded features). The second sequence of transformation operations may include generation of a third set of features based on an application of the neural network-based encoder 112 on the set of reconstructed reference PCFs 128. Thereafter, a second set of predicted features may be generated based on an application of the second neural network-based predictor 120 on the third set of features. In some embodiments, the third set of predicted features may be associated with a set of 3D points of each reconstructed reference PCF of the set of reference PCFs 124B . . . 124N that may correspond to the set of 3D points in the current PCF 124A that needs to be decoded. The second set of predicted features may be generated as output of the second neural network-based predictor 120. The second sequence of transformation operations may further include application of a gain vector of the set of gain vectors 116 on the third set of features. The application may lead to a generation of a third set of gain-modulated features. The third set of gain-modulated features may be generated based on modulation of the third set of features by use of the gain vector. The gain vector may be identical to the gain vector that was used for modulation of the first set of features and the first set of predicted features.

The second sequence of transformation operations may further include, an addition operation may be applied on the third set of gain-modulated features and the set of reconstructed residual features (i.e., the set of decoded features) for generation of a fourth set of features. The second sequence of transformation operations may further include an application of a selected inverse-gain vector on the fourth set of features to generate a set of gain-demodulated features. The selected inverse-gain vector may correspond to the gain-vector that was selected for modulating the first set of features (included in the 3D feature data) and the first set of predicted features and the gain-vector selected for modulating the third set of features. The inverse-gain vector may be selected from amongst the set of inverse-gain vectors 122 based on its association of the inverse-gain vector with a decoding rate and reception of an input indicative of a selected decoding rate that matches the decoding rate associated with the inverse-gain vector. The input may be based on the encoding rate associated with the gain vector that corresponds to the selected inverse-gain vector. The set of gain-demodulated features may be generated based on demodulation of the fourth set of features such that the current PCF 124A may be decoded at the selected decoding rate.

The electronic device 102 may be further configured to reconstruct the current PCF 124A of the PCF sequence 124 based on application of the second sequence of transformation operations on the set of decoded features (i.e., the reconstructed gain-modulated features or the set of reconstructed residual features). The reconstruction of the current PCF 124A may correspond to the generation of the reconstructed PCF 130. The application of the second sequence of transformation operations may be based on the selection of the I-frame decoding path or the P-frame decoding path. Therefore, if the I-frame encoding path is selected, the set of gain-demodulated features, generated based on the set of reconstructed gain-modulated features, may be used for the generation of the reconstructed PCF 130. On the other hand, if the P-frame encoding path is selected, the set of gain-demodulated features, generated based on the fourth set of features, may be used for the generation of the reconstructed PCF 130.

In accordance with an embodiment, the reconstructed PCF 130, corresponding to the current PCF 124A, may be generated based on an application of the neural network-based decoder 118 on the set of gain-demodulated features (generated based on selection of either of the I-frame decoding path or the P-frame decoding path).

Figure 2:
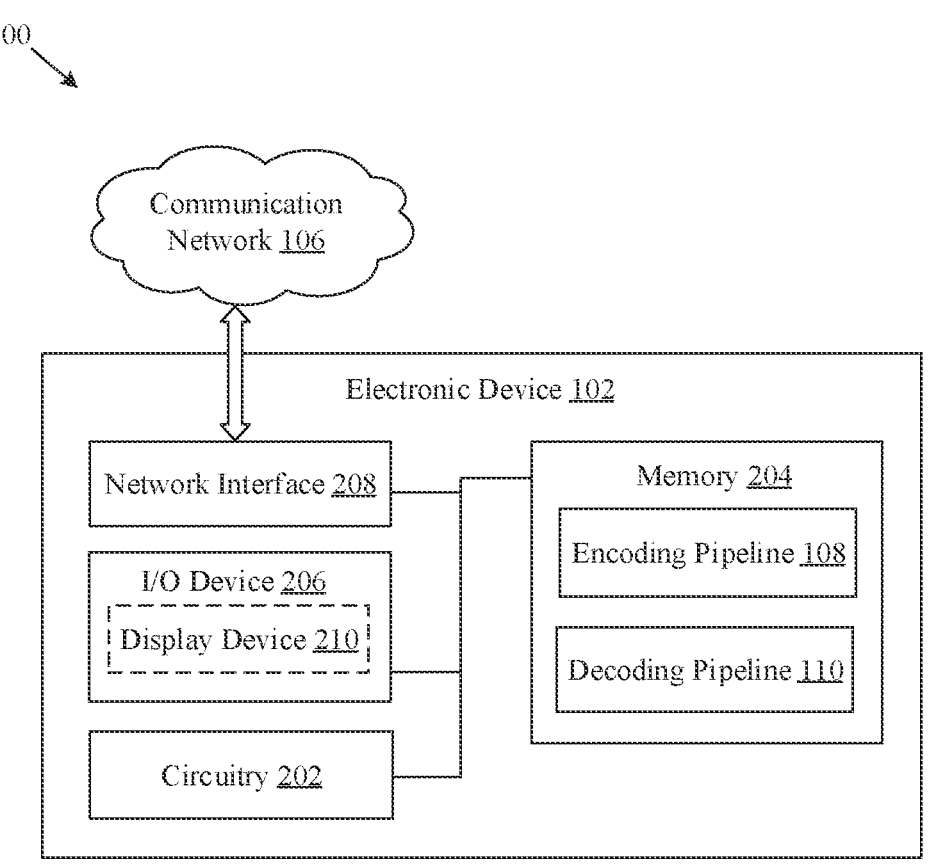
FIG. 2 is a block diagram that illustrates an exemplary electronic device that includes a rate-adaptive codec for dynamic point cloud compression, in accordance with an embodiment of the disclosure.

FIG. 2 is a block diagram that illustrates an exemplary electronic device that includes a rate-adaptive codec for dynamic point cloud compression, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, an input/output (I/O) device 206, and a network interface 208. In at least one embodiment, the memory 204 may include the encoding pipeline 108 and the decoding pipeline 110. In at least one embodiment, the I/O device 206 may include a display device 210. The circuitry 202 may be communicatively coupled to the memory 204, the I/O device 206, and the network interface 208, through wired or wireless communication of the electronic device 102.

The circuitry 202 may include suitable logic, circuitry, and interfaces that may be configured to execute program instructions associated with different operations to be executed by the electronic device 102. The operations may include reception of the PCF sequence 124 that may include a set of reference PCFs 124B . . . 124N and a current PCF 124A that may be required to be encoded, generation of 3D feature data based on an application of the neural network-based encoder 112 on at least one of the set of reference PCFs 124B . . . 124N and the current PCF 124A, selection, from the encoding pipeline 108, an encoding path (inclusive of a first sequence of transformation operations that may be applicable on the 3D feature data) as one of an I-frame encoding path or a P-frame encoding path for the current PCF 124A, generation of a bit-stream of coded PCF 126 based on application of the first sequence of transformation operations on the 3D feature data, application of a decoding operation on the bit-stream of coded PCF 126 to generate a set of decoded features of the current PCF 124A, selection, from the decoding pipeline 110, a decoding path (inclusive of a second sequence of transformation operations that may be applicable on the on the set of decoded features) as one of an I-frame decoding path or a P-frame decoding path, and reconstruction of the current PCF 124A (for generation of the reconstructed PCF 130) of the PCF sequence 124 based on an application of the second sequence of transformation operations on the set of decoded features. The circuitry 202 may include one or more processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a GPU, a CPU, a RISC processor, an ASIC processor, a CISC processor, a microcontroller, and/or other computing circuits.

The memory 204 may include suitable logic, circuitry, and/or interfaces that may be configured to store instructions executable by the circuitry 202. The memory 204 may be configured to store operating systems and associated applications. In at least one embodiment, the memory may store the set of gain vectors 116 and the set of inverse-gain vectors 122. The memory 204 may be further configured to store the PCF sequence 124, the first set of features, the second set of features, the third set of features, the fourth set of features, the first set of predicted features, the second set of predicted features, the first set of gain-modulated features, the second set of gain-modulated features, the third set of gain-modulated features, the set of gain-demodulated features, the set of residual features, the bit-stream of coded PCF 126, the set of reconstructed reference PCFs 128, the reconstructed PCF 130, and coordinate information associated with the set of 3D points in the current PCF 124A to be encoded. In at least one embodiment, the neural network-based encoder 112, the first neural network-based predictor 114, the second neural network-based predictor 120, the neural network-based decoder 118, included in the memory 204, may be implemented as a combination of programmable instructions stored in the memory 204 or logical units (i.e., programmable logic units) on a hardware circuitry of the electronic device 102. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive a user input that may trigger the reception of the PCF sequence 124, selection of the I-frame encoding path, the P-frame encoding path, the I-frame decoding path, the P-frame decoding path, an encoding rate (for selection of a gain vector of the set of gain vectors 116) or a decoding rate (for selection of an inverse-gain vector of the set of inverse-gain vectors 122). The I/O device 206 may be configured to provide an output in response to the user input. The I/O device 206 may include various input and output devices, which may be configured to communicate with the circuitry 202. Examples of the input devices may include, but are not limited to, a touch screen, a keyboard, a mouse, a joystick, and/or a microphone. Examples of the output devices may include the display device 210.

The display device 210 may include suitable logic, circuitry, interfaces, and/or code that may be configured to render each PCF (i.e., the current PCF 124A and the set of reference PCFs 124B . . . 124N) included in the PCF sequence 124 onto a display screen of the display device 210. The display device 210 may be further configured to render the reconstructed PCF 130 onto the display screen of the display device 210. In accordance with an embodiment, the display device 210 may include a touch screen to receive the user input. The display device 210 may be realized through several known technologies such as, but not limited to, a Liquid Crystal Display (LCD) display, a Light Emitting Diode (LED) display, a plasma display, and/or an Organic LED (OLED) display technology, and/or other display technologies. In accordance with an embodiment, the display device 210 may be a display screen of smart-glass device, a 3D display, a see-through display, a projection-based display, an electro-chromic display, and/or a transparent display.

The network interface 208 may include suitable logic, circuitry, interfaces, and/or code that may be configured to establish a communication between the electronic device 102 and the server 104, via the communication network 106. The network interface 208 may be implemented by use of various known technologies to support wired or wireless communication of the electronic device 102 with the communication network 106. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 208 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VOIP), light fidelity (Li-Fi), Wi-MAX, a protocol for email, instant messaging, and/or Short Message Service (SMS).

The functions or operations executed by the electronic device 102, as described in FIG. 1, may be performed by the circuitry 202. Operations executed by the circuitry 202 are described in detail, for example, in FIGS. 3A and 3B, FIG. 4, and FIG. 5.

Figure 3A:
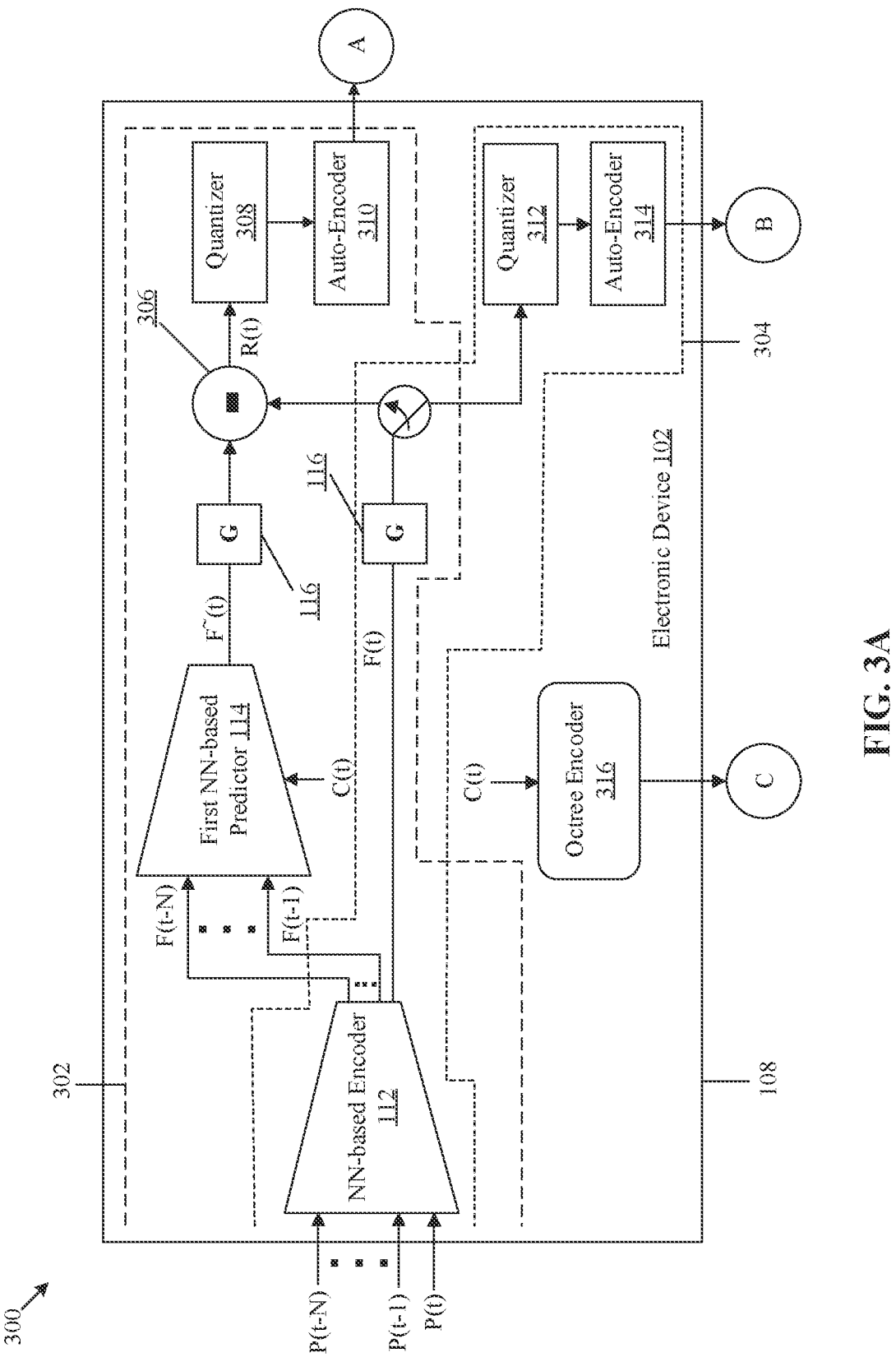
FIGS. 3A and 3B are diagrams that illustrate an exemplary rate-adaptive unified I-frame and P-frame codec architecture for dynamic point cloud compression and point cloud reconstruction, in accordance with an embodiment of the disclosure.
Figure 3B:
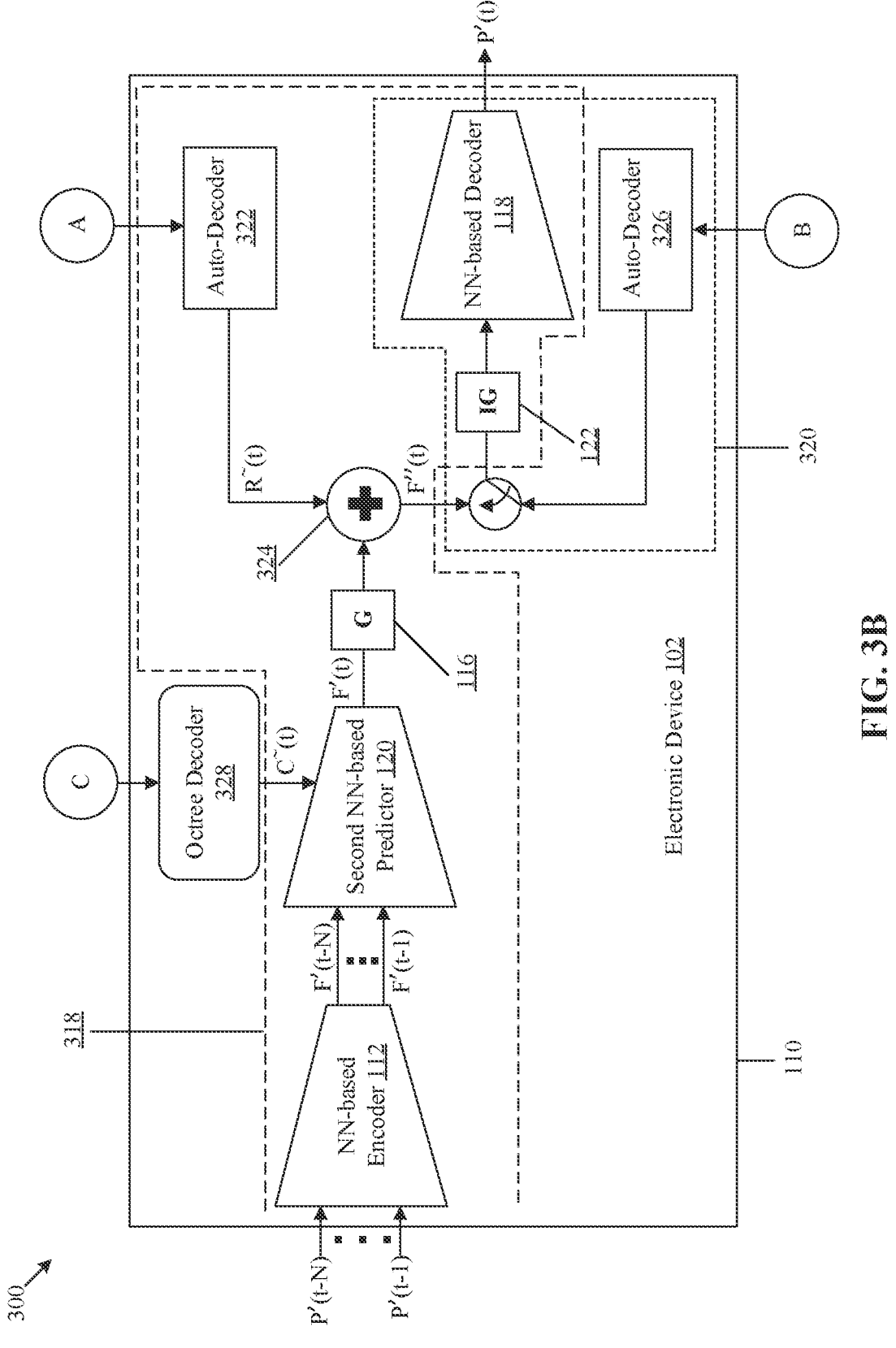

FIGS. 3A and 3B are diagrams that illustrate an exemplary rate-adaptive unified I-frame and P-frame codec architecture for dynamic point cloud compression and point cloud reconstruction, in accordance with an embodiment of the disclosure. FIGS. 3A and 3B are explained in conjunction with elements from FIG. 1 and FIG. 2. With reference to FIGS. 3A and 3B, there is shown an exemplary architecture 300 for dynamic point cloud compression and point cloud reconstruction. In the architecture 300, the electronic device 102 is shown to include an encoding pipeline 108 (see FIG. 3A) and a decoding pipeline 110 (see FIG. 3B).

The encoding pipeline 108 may include a P-frame encoding path 302 and an I-frame encoding path 304. The P-frame encoding path 302 may include the neural network-based encoder 112, the first neural network-based predictor 114, the set of gain vectors 116, a subtractor 306, a quantizer 308, and an auto-encoder 310. The I-frame encoding path 304 may include the neural network-based encoder 112, the set of gain vectors 116, a quantizer 312, and an auto-encoder 314. The encoding pipeline 108 may further include an octree-based encoder 316.

The decoding pipeline 110 (see FIG. 3B) may include a P-frame decoding path 318 and an I-frame decoding path 320. The P-frame decoding path 318 may include the neural network-based encoder 112, the second neural network-based predictor 120, the set of gain vectors 116, an auto-decoder 322, an accumulator 324, the set of inverse-gain vectors 122, and the neural network-based decoder 118. The I-frame decoding path 320 may include an auto-decoder 326, the set of inverse-gain vectors 122, and the neural network-based decoder 118. The decoding pipeline 110 may further include an octree-based decoder 328.

At any time-instant, the circuitry 202 may be configured to receive a PCF sequence that includes a set of reference PCFs (for example, P(t−1), P(t−2), . . . , and P(t−N)) and a current PCF (for example, P(t)) that is to be encoded. The set of reference PCFs and the current PCF may be received, by the neural network-based encoder 112, as inputs. Each reference PCF of the set of reference PCFs may precede the current PCF. The neural network-based encoder 112 may generate 3D feature data as output. The 3D feature data may include a first set of features (for example, F(t)) that may be associated with 3D points of the current PCF (i.e., P(t)). The first set of features may be associated with an occupancy of 3D points in the current PCF. In accordance with an embodiment, the 3D points may be a set of 3D points of the current PCF that may be required to be encoded. The circuitry 202 may determine that the set of 3D points are to be encoded based on an input that may include coordinate information (for example, C(t)) of the set of 3D points of the current PCF.

The 3D feature data may further include a second set of features associated with the set of reference PCFs (i.e., P(t−1), P(t−2), . . . , and P(t−N)). The second set of features may include a feature set associated with 3D points of each reference PCF of the set of reference PCFs. For example, the feature set associated with 3D points of the reference PCF P(t−1) may be F(t−1). Similarly, the feature set associated with the 3D points of the reference PCF P(t−N) may be F(t−N). The feature set associated with each reference PCF may include reference features associated with occupancy of 3D points in a corresponding reference PCF. The 3D points may correspond to the set of 3D points of the current PCF. The second set of features may be represented as {F(t−1) . . . F(t−N)}.

The circuitry 202 may be further configured to select from the encoding pipeline 108, an encoding path as the P-frame encoding path 302 or the I-frame encoding path 304 for encoding the current PCF. Each of the P-frame encoding path 302 and the I-frame encoding path 304 may include a first sequence of transformation operations that may be applicable on the 3D feature data. Based on selection of the P-frame encoding path 302, the first sequence of transformation operations may include application of the first neural network-based predictor 114 on the second set of features. Based on the application, a first set of predicted features (for example, F~(t)) may be generated as output.

For generation of the first set of predicted features, the feature set associated with the 3D points of each reference PCF may be down sampled by at least one scaling factor. In accordance with an embodiment, the feature set may be down sampled by scaling factors 2, 3, . . . , and K. For example, F(t−1) may be down sampled by a scaling factor of 2, 3, . . . , and K, for generation of multi-scale feature set $F^2$(t−1), $F^3$(t−1), . . . , and $F^K$(t−1), respectively. Similarly, F(t−N) may be down sampled for generation of multi-scale feature set $F^2$(t−N), $F^3$(t−N), . . . , and $F^K$(t−N).

For each scaling factor (i.e., 2, 3, . . . , or K), a spatiotemporal tensor may be generated using the feature sets associated with all reference PCFs of the set of reference PCFs down sampled by the same factor. For example, for scaling factor "2", a spatiotemporal tensor may be generated based on $F^2$(t−1), . . . , and $F^2$(t−N). Similarly, for scaling factor "K", a spatiotemporal tensor may be generated based on $F^K$(t−1), . . . , and $F^K$(t−N). In accordance with an embodiment, the generation of the spatiotemporal tensor for a certain scaling factor may be based on a spatiotemporal concatenation of the feature sets associated with all reference PCFs of the set of reference PCFs down sampled by the same scaling factor. For example, the spatiotemporal tensor for scaling factor "2" may be constructed based on a spatiotemporal concatenation of $F^2$(t−1), . . . , and $F^2$(t−N). Similarly, the spatiotemporal tensor for scaling factor "K" may be constructed based on a spatiotemporal concatenation of $F^K$(t−1), . . . , and $F^K$(t−N).

After the generation of (K−1) spatiotemporal tensors (for the scaling factors 2, 3, . . . , and K), a spatiotemporal analysis may be performed on each spatiotemporal tensor. In accordance with an embodiment, the spatiotemporal analysis may include performance of sparse convolution operation or self-attention operation on each spatiotemporal tensor for generation of a modified spatiotemporal tensor. The features represented by each modified spatiotemporal tensor may be down sampled by a certain scaling factor. The scaling factor may be based on the highest scaling factor (i.e., K) by which the feature set of each reference PCF of the set of reference PCFs were down sampled. Thereafter, an inception residual network (IRN) may be applied on each down sampled modified spatiotemporal tensor for generation of a final spatiotemporal tensor. Thus, (K−1) final spatiotemporal tensors may be generated, which may be concatenated for generation of a multi-scale feature concatenation vector. A sparse convolution operation or self-attention operation may be performed on the multi-scale feature concatenation vector.

The first neural network-based predictor 114 may further receive the coordinate information (i.e., C(t)) of the set of 3D points of the current PCF (i.e., P(t)) (to be encoded) for generation of the first set of predicted features. The first neural network-based predictor 114 may generate the first set of predicted features (i.e., F~(t)) based on C(t) and an outcome of the sparse convolution operation or the self-attention operation on the multi-scale feature concatenation vector.

The first sequence of transformation operations may further include an application of a selected gain vector on the first set of features (i.e., F(t)) to generate a first set of gain-modulated features. In accordance with an embodiment, the circuitry 202 may be configured to retrieve the set of gain vectors 116 from the memory 204. Each gain vector of the set of gain vectors 116 may correspond to an encoding rate associated with the encoding pipeline 108. Once the set of gain vectors 116 are retrieved, the circuitry 202 may select a gain vector from the set of gain vectors 116. The selected gain vector may modulate features of the first set of features such that the current PCF (i.e., P(t)) is encoded at an encoding rate to which the selected gain vector may correspond.

In accordance with an embodiment, the circuitry 202 may receive a first input that may include a selection of a first encoding rate for the current PCF (i.e., P(t)). The circuitry 202 may determine a gain vector from the set of gain vectors 116 corresponding to an encoding rate that matches the first encoding rate. On determination of such a gain vector from the set of gain vectors 116, the circuitry 202 may select the gain vector. Thus, the gain vector may be selected based on the first input. The first set of gain-modulated features may be generated based on modulation of the features of the first set of features (i.e., F(t)) by the selected gain vector.

The first sequence of transformation operations may further include application of the selected gain vector on the first set of predicted features (i.e., F~(t)) to generate a second set of gain-modulated features. The selected gain vector may modulate features of the first set of predicted features such that the current PCF (i.e., P(t)) is encoded at an encoding rate (the first encoding rate) to which the selected gain vector may correspond.

The first sequence of transformation operations may further include application of a difference operation on the first set of gain-modulated features and the second set of gain-modulated features. Based on the application, a set of residual features (i.e., R(t)) may be generated. In accordance with an embodiment, the subtractor 306 may receive the first set of gain-modulated features and the second set of gain-modulated features as inputs and apply the difference operation between the inputs for the generation of the set of residual features. The set of residual features may indicate a difference between an actual set of features and predicted set of features, as the first set of gain-modulated features and the second set of gain-modulated features are obtained based on F(t) and F~(t) respectively. The difference may be used to compensate for any error that may result in prediction of features associated with the current PCF (i.e., P(t)).

The quantizer 308 may receive the set of residual features (i.e., R(t)) as input and quantize each residual feature of the set of residual features to a quantization level of a set of predefined quantization levels. The quantizer 308 may generate, as output, a set of quantized residual features based on application of a quantization scheme on the set of residual features. The quantization scheme may be based on an entropy model. The auto-encoder 310 may receive the set of quantized residual features as input and generate a bit-stream of coded PCF as output. The generation may be based on application of an encoding scheme on the set of quantized residual features. The encoding scheme may be based on the entropy model. The encoding scheme may compress features of the set of quantized residual features to generate the bit-stream of coded PCF.

The bit-stream of coded PCF may be generated based on the set of residual features (i.e., R(t)) upon selection of the P-frame encoding path 302. The bit-stream of coded PCF may be encoded at the encoding rate to which the selected gain-vector may correspond. Thus, the bit-stream of coded PCF may be generated based on the selected gain vector. It may be noted that the bit-stream of coded PCF may be encoded at other encoding rates based on modulation of the features of the first set of features (i.e., F(t)) and the features of the first set of predicted features (i.e., F~(t)), and selection of other gain-vectors of the set of gain vectors 116 corresponding to the other encoding rates that may modulate features of F(t) and F (t). The other gain-vectors may be selected based on the first input that may indicate a specific value of the first encoding rate, which may match with an encoding rate to which one of the other gain-vectors may correspond.

On the other hand, based on selection of the I-frame encoding path 304, the first sequence of transformation operations may include an application of the selected gain vector on the first set of features (i.e., F(t)) to generate the first set of gain-modulated features. The quantizer 312 may receive the first set of gain-modulated features as input and quantize each feature of the first set of gain-modulated features to a quantization level of a set of predefined quantization levels. The quantizer 308 may generate a set of quantized gain-modulated features as output, based on application of a quantization scheme on the first set of gain-modulated features. The quantization scheme may be based on an entropy model. The auto-encoder 314 may receive the set of quantized gain-modulated features as input and generate the bit-stream of coded PCF as output. The generation of the bit-stream of coded PCF may be based on application of an encoding scheme on the set of quantized gain-modulated features. The encoding scheme may be based on the entropy model. The encoding scheme may compress the features of the set of quantized gain-modulated features to generate the bit-stream of coded PCF.

The bit-stream of coded PCF may be generated based on the first set of gain-modulated features upon selection of the I-frame encoding path 304. The bit-stream of coded PCF may be encoded at the encoding rate to which the selected gain-vector may correspond. Thus, the bit-stream of coded PCF may be generated based on the selected gain-vector. It may be noted that the bit-stream of coded PCF may be encoded at other encoding rates based on modulation of the features of the first set of features (i.e., F(t)) and selection of other gain-vectors of the set of gain vectors 116 that correspond to other encoding rates.

In accordance with an embodiment, the octree-based encoder 316 may receive, as input, the coordinate information (i.e., C(t)) of the set of 3D points of the current PCF (i.e., P(t)) to be encoded. The octree-based encoder 316 may encode the coordinate information to generate encoded coordinate information. The decoding pipeline 110 may receive the bit-stream of coded PCF (generated based on the set of residual features (i.e., R(t)) or the first set of gain-modulated features) and the encoded coordinate information. The octree-based decoder 328 of the decoding pipeline 110 may receive, as input, the encoded coordinate information and reconstruct the coordinate information (i.e., C(t)). Based on the reconstructed coordinate information (for example, $C^{\sim}(t)$), the circuitry 202 may determine the set of 3D points of the current PCF (i.e., P(t)) that are to be decoded.

In accordance with an embodiment, the circuitry 202 may be configured to apply a decoding operation on the bit-stream of coded PCF to generate a set of decoded features of the current PCF (i.e., P(t)). For application of the decoding operation, a decoding path may be selected from the decoding pipeline 110. The decoding path may be selected as the P-frame decoding path 318 or a I-frame decoding path 320. Based on selection of the P-frame decoding path 318 as the decoding path, the auto-decoder 322 may receive the bit-stream of coded PCF, generated based on the set of residual features (i.e., R(t)), as input. The auto-decoder 322 may apply the decoding operation on the bit-stream of coded PCF for the generation of the set of decoded features of the current PCF. The auto-decoder 322 may generate a set of reconstructed residual features (for example, $R^{\sim}(t)$) as the set of decoded features. The reconstruction (i.e., the decoding operation) may be based on a decoding scheme. The decoding scheme may be based on the entropy model. The decoding scheme may decompress features of the set of quantized residual features to generate the set of decoded features (i.e., $R^{\sim}(t)$).

On the other hand, based on selection of the I-frame decoding path 320 as the decoding path, the auto-decoder 326 may receive the bit-stream of coded PCF, generated based on the first set of gain-modulated features, as input. The auto-decoder 326 may apply the decoding operation on the bit-stream of coded PCF for the generation of the set of decoded features of the current PCF (i.e., P(t)). The decoding operation may be based on the decoding scheme. The decoding scheme may be based on the entropy model. The decoding scheme may decompress features of the set of quantized gain-modulated features to generate the set of decoded features.

The selected decoding path may include a second sequence of transformation operations that may be applicable on the set of decoded features. The current PCF (i.e., P(t)) of the PCF sequence may be reconstructed based on an application of the second sequence of transformation operations on the set of decoded features. For the selected decoding path as the P-frame decoding path 318, the second sequence of transformation operations may include reception of a PCF sequence that includes a set of reconstructed reference PCFs (for example, P'(t−1), P'(t−2), . . . , and P'(t−N). The reception may be based on reconstruction of the set of reference PCFs (i.e., P(t−1), P(t−2), . . . , and P(t−N)) prior to the reconstruction of the current PCF (i.e., P(t)). The neural network-based encoder 112 may receive the set of reconstructed reference PCFs as input.

The second sequence of transformation operations may further include generation of a third set of features (for example, {F'(t−1) . . . F'(t−N)}) based on application of the neural network-based encoder 112 on the set of reconstructed reference PCFs (i.e., P'(t−1), P'(t−2), . . . , and P'(t−N)). The third set of features may include a feature set associated with 3D points of each reconstructed reference PCF of the set of reconstructed reference PCFs. The feature sets associated with the set of reconstructed reference PCFs may be generated as outputs of the neural network-based encoder 112. For example, a feature set associated with 3D points of the reconstructed reference PCF P'(t−1) may be F'(t−1). Similarly, a feature set associated with 3D points of the reconstructed reference PCF P'(t−N) may be F'(t−N). The feature set associated with the 3D points of each reconstructed reference PCF may include features associated with an occupancy of 3D points in a corresponding reconstructed reference PCF. The 3D points of each reconstructed reference PCF may correspond to the set of 3D points of the current PCF (i.e., P(t)) which is to be decoded.

The second sequence of transformation operations may further include an application of the second neural network-based predictor 120 on the third set of features (i.e., {F'(t−1) . . . F'(t−N)}) to generate a second set of predicted features (for example, F'(t)). The second neural network-based predictor 120 may receive the third set of features (i.e., the feature set associated with 3D points of each reconstructed reference PCF of the set of reconstructed reference PCFs) and the reconstructed coordinate information (i.e., $C^{\sim}(t)$) as inputs. The second neural network-based predictor 120 may predict, as output, the second set of predicted features (i.e., F'(t)). The generation of the second set of predicted features (based on the third set of features) may be identical to the generation of the first set of predicted features (i.e., $F^{\sim}(t)$) by use of the first neural network-based predictor 114 (based on the second set of features, i.e., {F(t−1) . . . F(t−N)}).

The second sequence of transformation operations may further include an application of the selected gain vector on the second set of predicted features (i.e., F'(t)) to generate a third set of gain-modulated features. The selected gain vector may be the same gain vector that was used to modulate the first set of features (i.e., F(t)) and the first set of predicted features (i.e., F~(t)) for the generation of the first set of gain-modulated features and the second set of gain-modulated features respectively. The second sequence of transformation operations may further include an application of an addition operation on the third set of gain-modulated features and the set of decoded features (i.e., the set of reconstructed residual features or R~(t)) to generate a fourth set of features (for example, F''(t)). The accumulator 324 may receive the third set of gain-modulated features and the set of reconstructed residual features (i.e., R~(t)) as inputs. The accumulator 324 may generate, as output, the fourth set of features (i.e., F''(t)) associated with the 3D points whose coordinate information may be included in the reconstructed coordinate information (i.e., C~(t)).

The second sequence of transformation operations may further include an application of a selected inverse gain vector on the fourth set of features (i.e., F''(t)) to generate a set of gain-demodulated features. In accordance with an embodiment, the circuitry 202 may be configured to retrieve the set of inverse-gain vectors 122 from the memory 204. Each inverse-gain vector of the set of inverse-gain vectors 122 may correspond to a decoding rate associated with the decoding pipeline 110. Once the set of inverse-gain vectors 122 are retrieved, the circuitry 202 may select an inverse-gain vector from the set of inverse-gain vectors 122. The selected inverse-gain vector may correspond to the selected gain vector (based on which the third set of gain-modulated features is generated). The selected inverse-gain vector may demodulate features of the fourth set of features such that the current PCF (i.e., P(t)) is reconstructed at a decoding rate to which the selected inverse-gain vector may correspond.

In accordance with an embodiment, the circuitry 202 may receive a third input that may include a selection of a first decoding rate for reconstruction of the current PCF (i.e., P(t)). The selected first decoding rate may correspond to the first encoding rate. The circuitry 202 may determine an inverse-gain vector from the set of inverse-gain vectors 122 that corresponds to a decoding rate matching the first decoding rate. On determination of such an inverse-gain vector from the set of inverse-gain vectors 122, the circuitry 202 may select the inverse-gain vector. Thus, the inverse-gain vector may be selected based on the third input. Therefore, the set of gain-demodulated features may be generated based on demodulation of features of the fourth set of features (i.e., F''(t)) by the selected inverse-gain vector. The current PCF of the PCF sequence may be reconstructed (at the first decoding rate) based on the selected inverse gain vector.

The second sequence of transformation operations may further include an application of the neural network-based decoder 118 on the set of gain-demodulated features to reconstruct the current PCF (i.e., P(t)). The neural network-based decoder 118 may receive the set of gain-demodulated features as input and generate, as output, a reconstructed PCF (for example, P'(t)) that corresponds to the current PCF.

On the other hand, for the selected decoding path as the I-frame decoding path 320, the second sequence of transformation operations may include an application of the selected inverse gain vector on the set of decoded features (which is generated based on decoding of the first set of gain-modulated features) for generation of a set of gain-demodulated features. The selected inverse-gain vector may demodulate features of the set of decoded features such that the current PCF (i.e., P(t)) is reconstructed at a decoding rate to which the selected inverse-gain vector may correspond. Thus, the current PCF of the PCF sequence may be reconstructed (at the first decoding rate) based on the selected inverse gain vector. The second sequence of transformation operations may further include an application of the neural network-based decoder 118 on the set of gain-demodulated features to reconstruct the current PCF (i.e., P(t)). The neural network-based decoder 118 may receive the set of gain-demodulated features as input and generate, as output, a reconstructed PCF (i.e., P'(t)) that corresponds to the current PCF.

Figure 4:
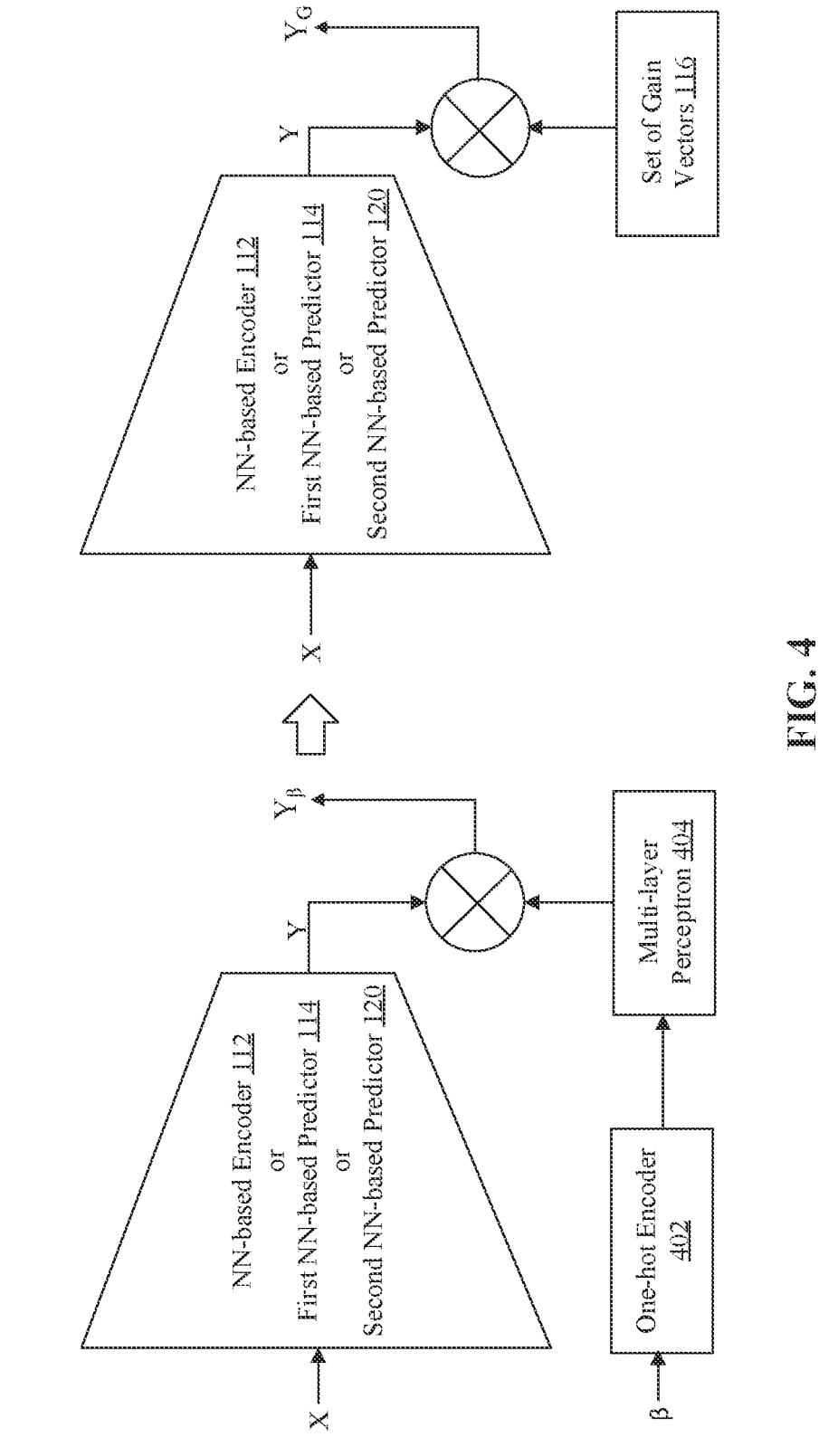
FIG. 4 is a block diagram that illustrates exemplary operations for generation of a set of gain vectors and encoding of point cloud frames at different encoding rates based on the set of gain vectors, in accordance with an embodiment of the disclosure.

FIG. 4 is a block diagram that illustrates exemplary operations for generation of a set of gain vectors and encoding of point cloud frames at different encoding rates based on the set of gain vectors, in accordance with an embodiment of the disclosure. FIG. 4 is explained in conjunction with elements from FIG. 1, FIG. 2, FIG. 3A, and FIG. 3B. With reference to FIG. 4, there is shown an exemplary scenario 400. In the exemplary scenario 400 there is shown an exemplary module which may be the neural network-based encoder 112, the first neural network-based predictor 114, or the second neural network-based predictor 120. The exemplary module may receive an input (represented by X), which may be the PCF sequence (input of the neural network-based encoder 112), the second set of features (input of the first neural network-based predictor 114) or the third set of features (input of the second neural network-based predictor 120). There is further shown a one-hot encoder 402 and a first neural network (for example, a multi-layer perceptron 404). The multi-layer perceptron 404 may be trained based on inputs received from the one-hot encoder 402. The trained multi-layer perceptron 404 may generate the set of gain vectors 116. The set of gain vectors 116 may modulate features generated by the neural network-based encoder 112, the first neural network-based predictor 114, or the second neural network-based predictor 120.

At any time-instance, the circuitry 202 may retrieve a first set of bits-per-point (BPP) values associated with a set of encoding rates for the encoding pipeline 108. The first set of BPP values may be provided as inputs to the one-hot encoder 402. The first set of BPP values may be received as inputs indicative of rates at which the current PCF may be required to be encoded. The one-hot encoder 402 may encode the first set of BPP values based on a one-hot encoding scheme to generate a set of encoded BPP values. For each input (i.e., a BPP value of the first set of BPP values represented as B), the one-hot encoder 402 may generate an encoded BPP value of the set of encoded BPP values. The encoded BPP value may be a one-hot vector. The circuitry 202 may feed each encoded BPP value of the set of encoded BPP values to a first neural network, i.e., the multi-layer perceptron 404. The set of encoded BPP values (i.e., a set of one-hot vectors) may be fed as inputs to the first neural network to train the first neural network.

For each encoded BPP value (input) of the set of encoded BPP values, the first neural network (i.e., the multi-layer perceptron 404) may generate an output. Thus, a set of outputs may be generated for the set of encoded BPP values. The circuitry 202 may compute a product (represented as $Y_\beta$) of the generated output and either of the first set of features (output of the neural network-based encoder 112 represented as Y), the first set of predicted features (output of the first neural network-based predictor 114 represented as Y), or the second set of predicted features (output of the second neural network-based predictor 120 represented as Y). Thus, a set of products may be computed for the set of outputs. The first neural network (i.e., the multi-layer perceptron 404) may be trained based on the computed set of products. Once the training of the first neural network (i.e., the multi-layer perceptron 404) is complete, the set of gain vectors 116 may be generated. Thus, each gain vector of the set of gain vectors 116 may be based on the training of the first neural network (i.e., the multi-layer perceptron 404).

After the generation of the set of gain vectors 116, the first neural network (i.e., the multi-layer perceptron 404) may be discarded. The circuitry 202 may select a gain-vector of the set of gain vectors 116 to modulate the first set of features (i.e., $F(t)$), the first set of predicted features (i.e., $F^-(t)$), or the second set of predicted features (i.e., $F'(t)$). The features of at least one of $F(t)$ and $F$ $(t)$ may be modulated for encoding of the current PCF (i.e., $P(t)$) at an encoding rate that corresponds to the selected gain-vector. On the other hand, the features of $F'(t)$ may be modulated (at the encoding rate that corresponds to the selected gain-vector) for decoding $P(t)$ or generating the reconstructed PCF (i.e., $P'(t)$) at a decoding rate that corresponds to the encoding rate.

However, in some scenarios, $P(t)$ may be required to be encoded at an encoding rate that does not match with any of the encoding rates to which gain-vectors of the set of gain vectors 116 correspond. Such scenarios may occur due to reception of a second input. The second input may include a selection of a second encoding rate for which a corresponding gain vector is absent from the set of gain vectors 116. In such scenarios, the circuitry 202 may generate an intermediate gain vector based on an interpolation or an extrapolation using at least one gain vector of the set of gain vectors 116. For example, the set of gain vectors 116 may include $g_1$ corresponding to 0.04 BPP, $g_2$ corresponding to 0.05 BPP, $g_3$ corresponding to 0.06 BPP, $g_4$ corresponding to 0.07 BPP, and $g_5$ corresponding to 0.08 BPP. In a first scenario, the second input may include a selection of the second encoding rate which is 0.055 BPP. For this second encoding rate, a corresponding gain vector is absent from the set of gain vectors 116. The second encoding rate does not match with any of the encoding rates to which the gain-vectors of the set of gain vectors 116 correspond. Therefore, an intermediate gain vector may be generated based on an interpolation using two gain vectors $g_2$ and $g_3$. In accordance with an embodiment, the intermediate gain vector (for example, $g_{23}$) may be generated as:

$$g_{23} = g_2 + (g_3 - g_2) \times \frac{(0.06 - 0.055)}{(0.06 - 0.05)}$$

In a second scenario, the second input may include a selection of the second encoding rate which is 0.035 BPP. For this second encoding rate, an intermediate gain vector may be generated based on an extrapolation using the gain vector $g_1$. In accordance with an embodiment, the intermediate gain vector (for example, $g_{11}$) may be generated as: $g_{11}=g_1 \times s$, $s \in (0.8,1)$. In a third scenario, the second input may include a selection of the second encoding rate which is 0.085 BPP. For this second encoding rate, an intermediate gain vector may be generated based on an extrapolation using the gain vector $g_5$. In accordance with an embodiment, the intermediate gain vector (for example, $g_{55}$) may be generated as: $g_{55}=g_5 \times s$, $s \in (1,1.15)$.

The circuitry 202 may be further configured to update the set of gain vectors 116 to include the generated intermediate gain vector (i.e., $g_{23}$, $g_{11}$, or $g_{55}$). Thus, the set of gain vectors 116 may be expanded to include additional gain-vectors such that the current PCF may be encoded at encoding rates that fall within a wide range without the requirement of retraining either of the neural network-based encoder 112, the first neural network-based predictor 114, or the second neural network-based predictor 120. The selected gain-vector, which may be used for modulating the features of $F(t)$, $F^-(t)$, or $F'(t)$, may be the generated intermediate gain vector.

Figure 5:
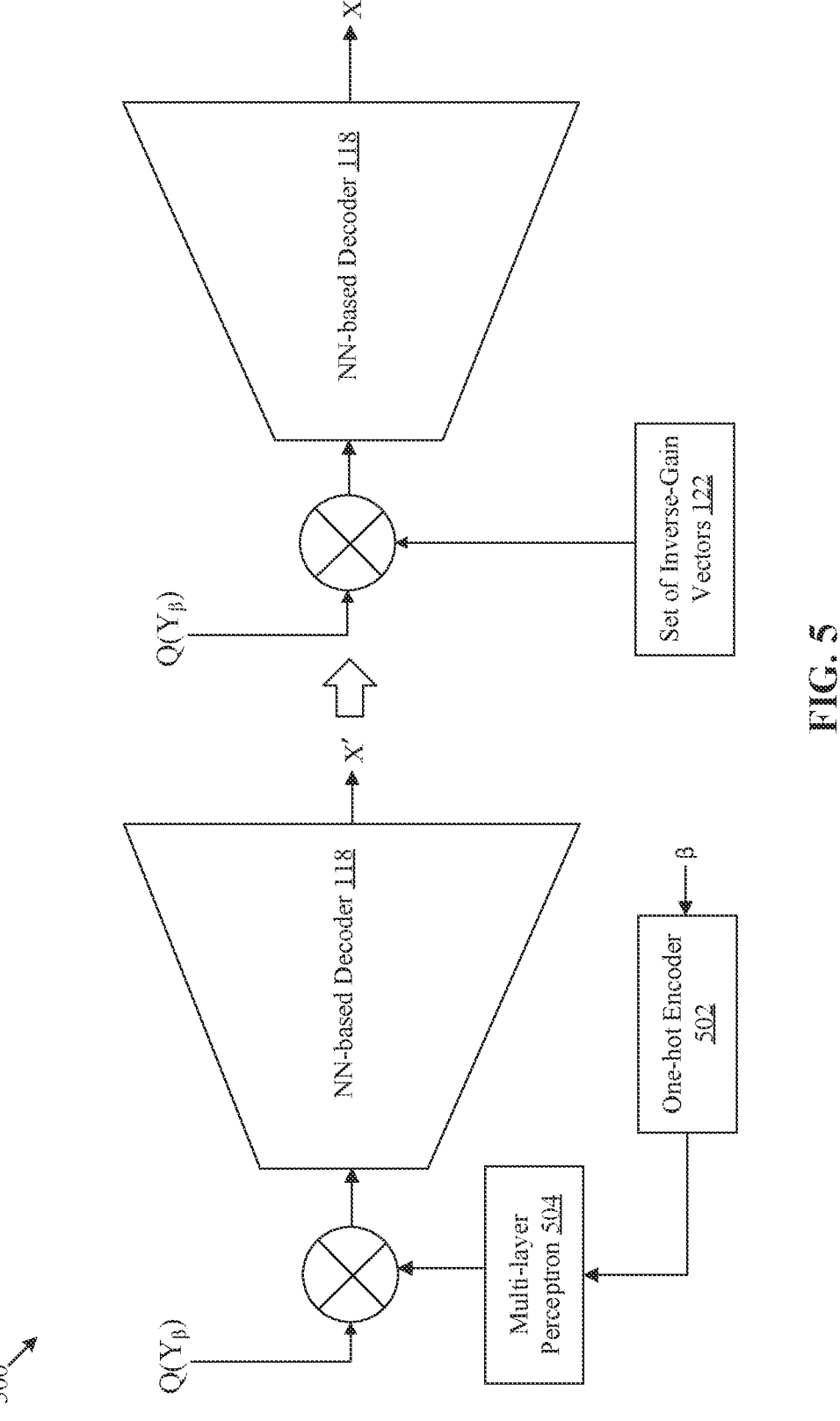
FIG. 5 is a block diagram that illustrates exemplary operations for generation of a set of inverse-gain vectors and decoding of point cloud frames based on the set of inverse-gain vectors, in accordance with an embodiment of the disclosure.

FIG. 5 is a block diagram that illustrates exemplary operations for generation of a set of inverse-gain vectors and decoding of point cloud frames based on the set of inverse-gain vectors, in accordance with an embodiment of the disclosure. FIG. 5 is explained in conjunction with elements from FIG. 1, FIG. 2, FIG. 3A, FIG. 3B, and FIG. 4. With reference to FIG. 5, there is shown an exemplary scenario 500. In the exemplary scenario 500, there is shown the neural network-based decoder 118. The neural network-based decoder 118 may generate a reconstructed PCF (represented by X') that may correspond to the current PCF. There is further shown a one-hot encoder 502 and a second neural network (for example, a multi-layer perceptron 504). The multi-layer perceptron 504 may be trained based on inputs received from the one-hot encoder 502. The trained multi-layer perceptron 504 may generate the set of inverse-gain vectors 122, which may be used to demodulate features of the fourth set of features (represented by $Q(Y_\beta)$) or features of the set of decoded features (represented by $Q(Y_\beta)$).

At any time-instance, the circuitry 202 may retrieve a second set of BPP values associated with a set of decoding rates for the decoding pipeline 110. The second set of BPP values may be provided as inputs to the one-hot encoder 502. The second set of BPP values may be received as inputs indicative of decoding rates, based on which the current PCF is to be reconstructed. The one-hot encoder 502 may encode the second set of BPP values based on a one-hot encoding scheme to generate a set of encoded BPP values (i.e., a set of one-hot vectors). For each input (i.e., a BPP value of the second set of BPP values represented as B), the one-hot encoder 502 may generate an encoded BPP value (i.e., a one-hot vector) of the set of encoded BPP values. The circuitry 202 may feed each encoded BPP value of the set of encoded BPP values to a second neural network, i.e., the multi-layer perceptron 504. The set of encoded BPP values (i.e., the set of one-hot vectors) may be fed as inputs to the second neural network to train the second neural network. For each encoded BPP value (input) of the set of encoded BPP values, the second neural network (i.e., the multi-layer perceptron 504) may generate an output. Thus, a set of outputs may be generated for the set of encoded BPP values. The circuitry 202 may compute a product of the generated output and either of the fourth set of features (represented by $Q(Y_\beta)$) or the set of decoded features (represented by $Q(Y_\beta)$). Thus, a set of products may be computed for the set of outputs. The second neural network (i.e., the multi-layer perceptron 504) may be trained based on the computed set of products. Once the training of the second neural network (i.e., the multi-layer perceptron 504) is complete, the set of inverse-gain vectors 122 may be generated. Thus, each inverse-gain vector of the set of inverse-gain vectors 122 may be generated based on the training of the second neural network (i.e., the multi-layer perceptron 504).

After the generation of the set of inverse-gain vectors 122, the second neural network (i.e., the multi-layer perceptron 504) may be discarded. The circuitry 202 may select an inverse-gain vector of the set of inverse-gain vectors 122 to demodulate the features of the fourth set of features or the features of the set of decoded features (which may be generated based on decoding of the first set of gain-modulated features). The features of the fourth set of features or the features of the set of decoded features may be demodulated for reconstruction of the current PCF (i.e., P(t)) at a decoding rate that corresponds to the selected inverse-gain vector. However, in some scenarios, P(t) may be required to be reconstructed (decoded) at a decoding rate that does not match any of the decoding rates to which inverse-gain vectors of the set of inverse-gain vectors 122 correspond. This may be due to the reception of the second input that includes the selection of the second encoding rate (for which a corresponding gain vector is absent from the set of gain vectors 116) and reception of a fourth input. The fourth input may include a selection of a second decoding rate for which a corresponding inverse-gain vector is absent from the set of inverse-gain vectors 122. In such scenarios, the circuitry 202 may generate an intermediate inverse-gain vector based on an extrapolation using an inverse-gain vector of the set of inverse-gain vectors 122. For example, the set of inverse-gain vectors 122 may include $ig_1$ corresponding to 25 units, $ig_2$ corresponding to 20 units, $ig_3$ corresponding to 16.67 units, $ig_4$ corresponding to 14.28 units, and $ig_5$ corresponding to 12.5 units.

In a first scenario, the fourth input may include a selection of the second decoding rate which is 30 units. For this second decoding rate, an intermediate inverse-gain vector may be generated based on an extrapolation using the inverse-gain vector $ig_1$. In accordance with an embodiment, the intermediate inverse-gain vector (for example, $ig_{11}$) may be generated as $$ig_{11} = ig_1 \times \frac{1}{s}, s \in (0.8, 1).$$

In a second scenario, the fourth input may include a selection of the second decoding rate which is 10 units. For this second decoding rate, an intermediate inverse-gain vector may be generated based on an extrapolation using the inverse-gain vector $ig_5$. In accordance with an embodiment, the intermediate inverse-gain vector (for example, $ig_{55}$) may be generated as:

$$ig_{55} = ig_5 \times \frac{1}{s}, s \in (1, 1.15).$$

The circuitry 202 may be further configured to update the set of inverse-gain vectors 122 to include the generated intermediate inverse-gain vector (i.e., $ig_{11}$, or $ig_{55}$). Thus, the set of inverse-gain vectors 122 may be expanded to include additional inverse-gain vectors such that the current PCF may be decoded at decoding rates that fall within a wide range without the requirement of retraining the neural network-based decoder 118. The selected inverse-gain vector, which may be used for demodulating the features of the fourth set of features or the features of the set of decoded features, may be the generated intermediate inverse-gain vector.

FIG. 6 is a flowchart that illustrates operations for an exemplary method for dynamic point cloud compression by use of a rate-adaptive unified I-frame and P-frame codec architecture, in accordance with an embodiment of the disclosure. FIG. 6 is explained in conjunction with elements from FIG. 1, FIG. 2, FIG. 3A, FIG. 3B, FIG. 4, and FIG. 5. With reference to FIG. 6, there is shown a flowchart 600. The operations from 602 to 610 may be implemented by any computing system, such as, by the electronic device 102, or the circuitry 202 of the electronic device 102. The operations may start at 602 and may proceed to 604.

At 604, a PCF sequence, that may include a set of reference PCFs and a current PCF that is to be encoded, may be received. In at least one embodiment, the circuitry 202 may be configured to receive the PCF sequence that may include the set of reference PCFs and the current PCF that is to be encoded. The details of reception of the set of reference PCFs and the current PCF, is described, for example, in FIG. 1 and FIG. 3A.

At 606, 3D feature data may be generated based on an application of the neural network-based encoder 112 on at least one of the set of reference PCFs and the current PCF. In at least one embodiment, the circuitry 202 may be configured to generate the 3D feature data based on the application of the neural network-based encoder 112 on at least one of the set of reference PCFs and the current PCF. The details of generation of the 3D feature data are described, for example, in FIG. 1 and FIG. 3A.

At 608, from the encoding pipeline 108, an encoding path may be selected as one of an I-frame encoding path or a P-frame encoding path for the current PCF. In at least one embodiment, the circuitry 202 may be configured to select from the encoding pipeline 108, the encoding path as one of the I-frame encoding path or the P-frame encoding path for the current PCF. The selected coding path may extend from an output of the neural network-based encoder 112 and include a first sequence of transformation operations that may be applicable on the 3D feature data. The details of selection of the encoding, is described, for example, in FIG. 1 and FIG. 3A.

At 610, a bit-stream of coded PCF may be generated based on application of the first sequence of transformation operations on the 3D feature data. In at least one embodiment, the circuitry 202 may be configured to generate the bit-stream of coded PCF based on application of the first sequence of transformation operations on the 3D feature data. The details of generation of the bit-stream of coded PCF, are described, for example, in FIG. 1, FIG. 3A, FIG. 3B, FIG. 4, and FIG. 5. Control may pass to end.

Although the flowchart 600 is illustrated as discrete operations, such as 604, 606, 608, and 610, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium, and/or a computer-readable recording medium having stored thereon, computer-executable instructions executable by a machine and/or a computer to operate an electronic device (for example, the electronic device 102 of FIG. 1). Such instructions may cause the electronic device 102 to perform operations comprising storing an encoding pipeline (such as the encoding pipeline 108 of FIG. 1) that includes a neural network-based encoder (such as the neural network-based encoder 112 of FIG. 1) and a set of gain vectors (such as the set of gain vectors 116 of FIG. 1). The operations may further include storing a decoding pipeline (such as the decoding pipeline 110) that includes a neural network-based decoder (such as the neural network-based decoder 118 of FIG. 1) and a set of inverse gain vectors (such as the set of inverse-gain vectors 122 of FIG. 1). The operations may further include receiving a PCF sequence that includes a set of reference PCFs and a current PCF that is to be encoded and generating 3D feature data based on application of the neural network-based encoder 112 on at least one of the set of reference PCFs and the current PCF. The 3D feature data may include a first set of features associated with the current PCF and a second set of features associated with the set of reference PCFs. The operations may further include selecting from the encoding pipeline 108, an encoding path as one of an I-frame encoding path or a P-frame encoding path for the current PCF. The selected coding path may extend from an output of the neural network-based encoder 112 and may include a first sequence of transformation operations that may be applicable on the 3D feature data. For the selected coding path as the I-frame encoding path, the first sequence of transformation operations may include an application of the selected gain vector on the first set of features to generate a first set of gain-modulated features. For the selected coding path as the P-frame encoding path, the first sequence of transformation operations may include an application of the first neural network-based predictor 114 on the second set of features to generate a first set of predicted features, an application of the selected gain vector on the first set of features to generate a first set of gain-modulated features, an application of the selected gain vector on the first set of predicted features to generate a second set of gain-modulated features, an application of a difference operation on the first set of gain-modulated features and the second set of gain-modulated features to generate a set of residual features. The operations may further include generating a bit-stream of coded PCF based on application of the first sequence of transformation operations on the 3D feature data. The bit-stream of coded PCF may be generated based on the first set of gain-modulated features or the set of residual features.

Exemplary aspects of the disclosure may include an electronic device (such as, the electronic device 102 of FIG. 1) that may include circuitry (such as the circuitry 202 of FIG. 2). The electronic device 102 may further include memory (such as the memory 204 of FIG. 2) that may be configured to store an encoding pipeline (such as the encoding pipeline 108 of FIG. 1) that includes a neural network-based encoder (such as the neural network-based encoder 112 of FIG. 1) and a set of gain vectors (such as the set of gain vectors 116 of FIG. 1). The memory 204 may be further configured to store a decoding pipeline (such as the decoding pipeline 110) that includes a neural network-based decoder (such as the neural network-based decoder 118 of FIG. 1) and a set of inverse gain vectors (such as the set of inverse-gain vectors 122 of FIG. 1). The circuitry 202 may be configured to receive a PCF sequence that includes a set of reference PCFs and a current PCF that is to be encoded. The circuitry 202 may be further configured to generate 3D feature data based on application of the neural network-based encoder 112 on at least one of the set of reference PCFs and the current PCF. The 3D feature data may include a first set of features associated with the current PCF and a second set of features associated with the set of reference PCFs. The circuitry 202 may be further configured to select from the encoding pipeline 108, an encoding path as one of an I-frame encoding path or a P-frame encoding path for the current PCF. The selected coding path may extend from an output of the neural network-based encoder 112 and may include a first sequence of transformation operations that may be applicable on the 3D feature data. For the selected coding path as the I-frame encoding path, the first sequence of transformation operations may include an application of the selected gain vector on the first set of features to generate a first set of gain-modulated features. For the selected coding path as the P-frame encoding path, the first sequence of transformation operations may include an application of the first neural network-based predictor 114 on the second set of features to generate a first set of predicted features, an application of the selected gain vector on the first set of features to generate a first set of gain-modulated features, an application of the selected gain vector on the first set of predicted features to generate a second set of gain-modulated features, an application of a difference operation on the first set of gain-modulated features and the second set of gain-modulated features to generate a set of residual features. The circuitry 202 may be further configured to generate a bit-stream of coded PCF based on application of the first sequence of transformation operations on the 3D feature data. The bit-stream of coded PCF may be generated based on the first set of gain-modulated features or the set of residual features.

In accordance with an embodiment, the circuitry 202 may be further configured to retrieve the set of gain vectors 116 from the memory 204. Each gain vector of the set of gain vectors 116 may correspond to an encoding rate associated with the encoding pipeline 108. The circuitry 202 may be further configured to select a gain vector from the set of gain vectors 116. The bit-stream of coded PCF may be generated further based on the selected gain vector.

In accordance with an embodiment, the circuitry 202 may be further configured to receive a first input that may include a selection of a first encoding rate for the current PCF. The gain vector may be selected based on the first input.

In accordance with an embodiment, the circuitry 202 may be further configured to receive a second input that may include a selection of a second encoding rate for which a corresponding gain vector is absent from the set of gain vectors 116. The circuitry 202 may be further configured to generate an intermediate gain vector based on an interpolation or an extrapolation using at least one gain vector of the set of gain vectors 116. The circuitry 202 may be further configured to update the set of gain vectors 116 to include the generated intermediate gain vector. The selected gain vector may be the intermediate gain vector.

In accordance with an embodiment, the circuitry 202 may be further configured to retrieve a first set of BPP values associated with a set of encoding rates for the encoding pipeline 108. The circuitry 202 may be further configured to encode the first set of BPP values based on a one-hot encoding scheme to generate a set of encoded BPP values. The circuitry 202 may be further configured to feed each encoded BPP value of the set of encoded BPP values to a first neural network. The circuitry 202 may be further configured to generate an output of the first neural network for each encoded BPP value of the set of encoded BPP values. The circuitry 202 may be further configured to compute a product of the generated output with the first set of features. The circuitry 202 may be further configured to train the first neural network based on the computed product. The circuitry 202 may be further configured to generate each gain vector of the set of gain vectors based on the training of the first neural network.

In accordance with an embodiment, the circuitry 202 may be further configured to apply a decoding operation on the bit-stream of coded PCF to generate a set of decoded features of the current PCF. The circuitry 202 may be further configured to select from the decoding pipeline 110, a decoding path as one of an I-frame decoding path or a P-frame decoding path. The decoding path may include a second sequence of transformation operations that may be applicable on the set of decoded features. For the selected decoding path as the I-frame decoding path, the second sequence of transformation operations may include an application of the selected inverse gain vector on the set of decoded features to generate a set of gain-demodulated features, and an application of the neural network-based decoder 118 on the set of gain-demodulated features to reconstruct the current PCF. For the selected decoding path as the P-frame decoding path, the second sequence of transformation operations may include a reception of a PCF sequence that may include a set of reconstructed reference PCFs, a generation of a third set of features based on application of the neural network-based encoder 112 on the set of reconstructed reference PCFs, an application of a second neural network-based predictor 120 on the third set of features to generate a second set of predicted features, an application of the selected gain vector on the second set of predicted features to generate a third set of gain-modulated features, an application of an addition operation on the third set of gain-modulated features and the set of decoded features to generate a fourth set of features, an application of the selected inverse gain vector on the fourth set of features to generate a set of gain-demodulated features, and an application of the neural network-based decoder 118 on the set of gain-demodulated features to reconstruct the current PCF. The circuitry 202 may be further configured to reconstruct the current PCF of the PCF sequence based on application of the second sequence of transformation operations on the set of decoded features.

In accordance with an embodiment, the circuitry 202 may be further configured to retrieve the set of gain vectors from the memory 204. Each gain vector of the set of gain vectors 116 may correspond to an encoding rate associated with the encoding pipeline 108. The circuitry 202 may be further configured to select a gain vector from the set of gain vectors 116. The circuitry 202 may be further configured to retrieve the set of inverse gain vectors from the memory 204. Each inverse gain vector of the set of inverse-gain vectors 122 may correspond to a decoding rate associated with the decoding pipeline 110. The circuitry 202 may be further configured to select an inverse gain vector from the set of inverse-gain vectors 122. The selected inverse gain vector may correspond to the selected gain vector. The current PCF of the PCF sequence may be reconstructed further based on the selected inverse gain vector.

In accordance with an embodiment, the circuitry 202 may be further configured to receive a third input that includes a selection of a first decoding rate for reconstruction of the current PCF. The inverse gain vector may be selected based on the third input.

In accordance with an embodiment, the circuitry 202 may be further configured to receive a fourth input that may include a selection of a second decoding rate for which a corresponding inverse gain vector may be absent from the set of inverse-gain vectors 122. The circuitry 202 may be further configured to generate an intermediate inverse gain vector based on an extrapolation using an inverse gain vector of the set of inverse-gain vectors 122. The circuitry 202 may be further configured to update the set of inverse-gain vectors 122 to include the generated intermediate inverse gain vector. The selected inverse gain vector may be the intermediate inverse gain vector.

In accordance with an embodiment, the circuitry 202 may be further configured to retrieve a second set of BPP values associated with a set of decoding rates for the decoding pipeline 110. The circuitry 202 may be further configured to encode the second set of BPP values based on a one-hot encoding scheme to generate a set of encoded BPP values. The circuitry 202 may be further configured to feed each encoded BPP value of the set of encoded BPP values to a second neural network. The circuitry 202 may be further configured to generate an output of the second neural network for each encoded BPP value of the set of encoded BPP values. The circuitry 202 may be further configured to compute a product of the generated output with the set of decoded features. The circuitry 202 may be further configured to train the second neural network based on the computed product. The circuitry 202 may be further configured to generate each inverse gain vector of the set of inverse-gain vectors 122 based on the training of the second neural network.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:
1. An electronic device, comprising:
 a memory configured to:
  store an encoding pipeline that includes a neural network-based encoder and a set of gain vectors; and
  store a decoding pipeline that includes a neural network-based decoder and a set of inverse gain vectors; and circuitry configured to:

receive a point cloud frame (PCF) sequence that includes a set of reference point cloud frames (PCFs) and a current PCF;

generate 3D feature data based on application of the neural network-based encoder on at least one of the set of reference PCFs and the current PCF;

select, from the stored encoding pipeline, an encoding path as one of an I-frame encoding path or a P-frame encoding path for the current PCF, wherein the selected encoding path extends from an output of the neural network-based encoder, and the selected encoding path includes a first sequence of transformation operations that is applicable on the 3D feature data;

generate a bit-stream of coded PCF based on application of the first sequence of transformation operations on the generated 3D feature data;

apply a decoding operation on the generated bit-stream of coded PCF to generate a set of decoded features of the current PCF;

select, from the stored decoding pipeline, a decoding path as one of an I-frame decoding path or a P-frame decoding path, wherein the selected decoding path includes a second sequence of transformation operations that is applicable on the set of decoded features; and reconstruct the current PCF of the PCF sequence based on application of the second sequence of transformation operations on the set of decoded features.

2. The electronic device according to claim 1, wherein the 3D feature data includes:

a first set of features associated with the current PCF, and a second set of features associated with the set of reference PCFs.

3. The electronic device according to claim 2, wherein the circuitry is further configured to:

retrieve the set of gain vectors from the memory, wherein each gain vector of the set of gain vectors corresponds to an encoding rate associated with the encoding pipeline, and select a gain vector from the set of gain vectors.

4. The electronic device according to claim 3, wherein the circuitry is further configured to receive a first input that includes a selection of a first encoding rate for the current PCF, wherein the gain vector is selected based on the first input.

5. The electronic device according to claim 3, wherein the circuitry is further configured to:

receive a second input that includes a selection of a second encoding rate for which a corresponding gain vector is absent from the set of gain vectors;

generate an intermediate gain vector based on an interpolation or an extrapolation using at least one gain vector of the set of gain vectors; and update the set of gain vectors to include the generated intermediate gain vector, wherein the selected gain vector is the intermediate gain vector.

6. The electronic device according to claim 3, wherein the circuitry is further configured to:

retrieve a first set of bits per point (BPP) values associated with a set of encoding rates for the encoding pipeline;

encode the first set of BPP values based on a one-hot encoding scheme to generate a set of encoded BPP values;

feed each encoded BPP value of the set of encoded BPP values to a first neural network;

generate an output of the first neural network for each encoded BPP value of the set of encoded BPP values;

compute a product of the generated output with the first set of features;

train the first neural network based on the computed product; and generate each gain vector of the set of gain vectors based on the trained first neural network.

7. The electronic device according to claim 3, wherein the bit-stream of coded PCF is generated further based on the selected gain vector.

8. The electronic device according to claim 3, wherein, for the selected coding path as the I-frame encoding path, the first sequence of transformation operations comprises an application of the selected gain vector on the first set of features to generate a first set of gain-modulated features, and the bit-stream of coded PCF is generated based on the first set of gain-modulated features.

9. The electronic device according to claim 3, wherein, for the selected coding path as the P-frame encoding path, the first sequence of transformation operations comprises:

an application of a first neural network-based predictor on the second set of features to generate a first set of predicted features, an application of the selected gain vector on the first set of features to generate a first set of gain-modulated features, an application of the selected gain vector on the first set of predicted features to generate a second set of gain-modulated features, and an application of a difference operation on the first set of gain-modulated features and the second set of gain-modulated features to generate a set of residual features, and the bit-stream of coded PCF is generated based on the set of residual features.

10. The electronic device according to claim 1, wherein the circuitry is further configured to:

retrieve the set of gain vectors from the memory, wherein each gain vector of the set of gain vectors corresponds to an encoding rate associated with the encoding pipeline;

select a gain vector from the set of gain vectors;

retrieve the set of inverse gain vectors from the memory, wherein each inverse gain vector of the set of inverse gain vectors corresponds to a decoding rate associated with the decoding pipeline; and select an inverse gain vector from the set of inverse gain vectors, wherein the selected inverse gain vector corresponds to the selected gain vector.

11. The electronic device according to claim 10, wherein the circuitry is further configured to receive a third input that includes a selection of a first decoding rate for reconstruction of the current PCF, wherein the inverse gain vector is selected based on the third input.

12. The electronic device according to claim 10, wherein the circuitry is further configured to:

receive a fourth input that includes a selection of a second decoding rate for which a corresponding inverse gain vector is absent from the set of inverse gain vectors;

generate an intermediate inverse gain vector based on an extrapolation using an inverse gain vector of the set of inverse gain vectors; and

update the set of inverse gain vectors to include the generated intermediate inverse gain vector, wherein the selected inverse gain vector is the intermediate inverse gain vector.

13. The electronic device according to claim 10, wherein the circuitry is further configured to:

retrieve a second set of bits per point (BPP) values associated with a set of decoding rates for the decoding pipeline;

encode the second set of BPP values based on a one-hot encoding scheme to generate a set of encoded BPP values;

feed each encoded BPP value of the set of encoded BPP values to a second neural network;

generate an output of the second neural network for each encoded BPP value of the set of encoded BPP values;

compute a product of the generated output with the set of decoded features;

train the second neural network based on the computed product; and generate each inverse gain vector of the set of inverse gain vectors based on the trained second neural network.

14. The electronic device according to claim 10, wherein the current PCF of the PCF sequence is reconstructed further based on the selected inverse gain vector.

15. The electronic device according to claim 10, wherein, for the selected decoding path as the I-frame decoding path, the second sequence of transformation operations comprises:

an application of the selected inverse gain vector on the set of decoded features to generate a set of gain-demodulated features, and an application of the neural network-based decoder on the set of gain-demodulated features to reconstruct the current PCF.

16. The electronic device according to claim 10, wherein, for the selected decoding path as the P-frame decoding path, the second sequence of transformation operations comprises:

a reception of a PCF sequence that includes a set of reconstructed reference PCFs, a generation of a third set of features based on application of the neural network-based encoder on the set of reconstructed reference PCFs, an application of a second neural network-based predictor on the third set of features to generate a second set of predicted features, an application of the selected gain vector on the second set of predicted features to generate a third set of gain-modulated features, an application of an addition operation on the third set of gain-modulated features and the set of decoded features to generate a fourth set of features,

34 an application of the selected inverse gain vector on the fourth set of features to generate a set of gain-demodulated features, and an application of the neural network-based decoder on the set of gain-demodulated features to reconstruct the current PCF.

17. A method, comprising:

in an electronic device that includes a memory:

storing, in the memory, an encoding pipeline that includes a neural network-based encoder and a set of gain vectors;

storing, in the memory, a decoding pipeline that includes a neural network-based decoder and a set of inverse gain vectors;

receiving a point cloud frame (PCF) sequence that includes a set of reference point cloud frames (PCFs) and a current PCF;

generating 3D feature data based on application of the neural network-based encoder on at least one of the set of reference PCFs and the current PCF;

selecting, from the encoding pipeline, an encoding path as one of an I-frame encoding path or a P-frame encoding path for the current PCF, wherein the selected encoding path extends from an output of the neural network-based encoder, and the selected encoding path includes a first sequence of transformation operations that is applicable on the 3D feature data;

generating a bit-stream of coded PCF based on application of the first sequence of transformation operations on the generated 3D feature data;

applying a decoding operation on the generated bit-stream of coded PCF for generating a set of decoded features of the current PCF;

selecting, from the stored decoding pipeline, a decoding path as one of an I-frame decoding path or a P-frame decoding path, wherein the selected decoding path includes a second sequence of transformation operations that is applicable on the set of decoded features; and reconstructing the current PCF of the PCF sequence based on application of the second sequence of transformation operations on the set of decoded features.

18. The method according to claim 17, further comprising:

retrieving the set of gain vectors from the memory, wherein each gain vector of the set of gain vectors corresponds to an encoding rate associated with the encoding pipeline; and selecting a gain vector from the set of gain vectors, wherein the bit-stream of coded PCF is generated further based on the selected gain vector.

* * * * *